United States Patent
Srinivasan et al.

(10) Patent No.: US 12,159,116 B1
(45) Date of Patent: Dec. 3, 2024

(54) CONTEXTUAL UTTERANCE RECOMMENDATIONS FOR NATURAL LANGUAGE INTERFACES THAT SUPPORT CONVERSATIONAL VISUAL ANALYSIS

(71) Applicant: Tableau Software, LLC, Seattle, WA (US)

(72) Inventors: Arjun Srinivasan, Seattle, WA (US); Vidya Raghavan Setlur, Portola Valley, CA (US)

(73) Assignee: Tableau Software, LLC, Seattle, WA (US)

( * ) Notice: Subject to any disclaimer, the term of this patent is extended or adjusted under 35 U.S.C. 154(b) by 100 days.

(21) Appl. No.: 17/572,536

(22) Filed: Jan. 10, 2022

Related U.S. Application Data

(60) Provisional application No. 63/172,013, filed on Apr. 7, 2021.

(51) Int. Cl.
| | |
|---|---|
| *G06F 17/00* | (2019.01) |
| *G06F 3/04842* | (2022.01) |
| *G06F 40/35* | (2020.01) |
| *G06T 11/20* | (2006.01) |

(52) U.S. Cl.
CPC .......... *G06F 40/35* (2020.01); *G06F 3/04842* (2013.01); *G06T 11/206* (2013.01)

(58) Field of Classification Search
CPC ..... G06F 40/35; G06F 3/04842; G06T 11/206
See application file for complete search history.

(56) References Cited

U.S. PATENT DOCUMENTS

| | | | | |
|---|---|---|---|---|
| 8,346,563 B1 * | 1/2013 | Hjelm | ................ | G10L 15/1822 |
| | | | | 704/251 |
| 10,956,433 B2 * | 3/2021 | Singh | ................ | G06F 16/24578 |
| 11,314,786 B1 * | 4/2022 | Setlur | ................ | G06T 11/206 |
| 11,698,933 B1 * | 7/2023 | Atallah | ................ | G06F 16/9038 |
| | | | | 707/767 |
| 11,735,204 B2 * | 8/2023 | Sakaguchi | ............. | G10L 21/14 |
| | | | | 704/200 |
| 11,790,010 B2 * | 10/2023 | Tory | .................... | G06F 3/04847 |
| | | | | 715/744 |

(Continued)

FOREIGN PATENT DOCUMENTS

WO    WO-2022076220 A1 *    4/2022    ......... G06F 16/2423

*Primary Examiner* — Laurie A Ries
(74) *Attorney, Agent, or Firm* — Morgan, Lewis & Bockius LLP

(57) ABSTRACT

A computing device receives user selection of a data source. In accordance with the user selection, the device generates one or more initial natural language utterances according to metrics of data fields in the data source and/or previous user interaction with the data source. Each of the initial natural language utterances corresponds to a respective suggestion to guide visual analysis of the data source. The device displays the initial utterances in a graphical user interface. The device receives user selection of a first initial utterance of the initial utterances. In response to the user selection, the device generates and displays a first data visualization in accordance with data fields and/or analytical operations specified in the first initial utterance. The device also generates updated natural language utterances in accordance with the first initial utterance and the first data visualization, and displays the updated utterances with the first data visualization.

20 Claims, 38 Drawing Sheets

(56) References Cited

U.S. PATENT DOCUMENTS

| | | | |
|---|---|---|---|
| 11,934,461 B2* | 3/2024 | Setlur | G06F 40/30 |
| 2012/0271837 A1* | 10/2012 | Kryger | G06F 16/9535 |
| | | | 707/E17.014 |
| 2015/0278213 A1* | 10/2015 | Anand | G06F 16/24578 |
| | | | 707/723 |
| 2016/0351074 A1* | 12/2016 | Paul | A61B 5/4803 |
| 2017/0177660 A1* | 6/2017 | Chang | G06F 16/2425 |
| 2019/0138648 A1* | 5/2019 | Gupta | H04L 51/02 |
| 2021/0303626 A1* | 9/2021 | Hearst | G06F 40/253 |
| 2022/0067109 A1* | 3/2022 | Mansoor | G06F 16/2358 |
| 2022/0139372 A1* | 5/2022 | Muschett | G06F 40/216 |
| | | | 704/257 |
| 2022/0237228 A1* | 7/2022 | Xu | G06F 16/2474 |

* cited by examiner

```
<utterance>      → <groupCmd> | <distributionCmd> | <correlateCmd> | <trendCmd> | <filterCmd> | <extremaCmd> | <followupCmd>;
<groupCmd>       → <dimension> ('group by' | 'by')? <aggMeasure>;
<aggMeasure>     → aggTerms <measure>;
<aggTerms>       → ('average' | 'median' | 'mean' | 'min' | 'max');
<distributionCmd> → ('distribution' | 'bin') <measure>;
<correlateCmd>   → <measure> ('correlation' | 'scatterplot' | 'relationship')? <measure>;
<trendCmd>       → ('trend' | 'over time')? <dimension> <dateAttribute>;
<filterCmd>      → <locationFilter> | <temporalFilter> | <valueFilter>;
<locationFilter> → <filterPlaceCmd> <location>;
<temporalFilter> → ('in' | 'before' | 'after') <timeDataValue> | <timeDateRange>;
<valueFilter>    → (<lessThan> | <equalTo> | <greaterThan> | <lessEqual> | <greaterEqual>) <measure>;
<extremaCmd>     → ('highest' | 'largest' | 'smallest' | 'lowest') <measure>;
<calculationCmd> → (<correlation> | 'difference' | 'total' | 'lowest' | aggTerms) <measure>;
<followupCmd>    → (<pragmaticMarker> | <referential>) <utterance>;
<pragmaticMarker> → (('what' | 'how') 'about') | 'also' | 'just' | 'only')?;
<referential>    → ('this' | 'that')?;
```

Figure 6

| Intent | Parameters | Parameter Selection Functions (used in combination with the intersection scores from the context state object) | Parameter Selection Logic |
|---|---|---|---|
| Correlate | (measure, measure) | Pearson's correlation coefficient ($r$) | Attribute combinations that have higher $|r|$ are prioritized over combinations with lower $|r|$. |
| Group | (dimension, measure) | Standard deviation ($\sigma$) | Attribute combinations with higher $\sigma$ are prioritized over combinations with lower $\sigma$. By default, $\sigma$ is calculated using the mean values for a measure over each group/category in a dimension. |
| Trend | (dimension, measure) | Standard deviation ($\sigma$) | Attribute combinations with higher $\sigma$ are prioritized over combinations with lower $\sigma$. By default, $\sigma$ is calculated using the mean values for a measure over each timestamp in a dimension. |
| Distribution | (dimension), (measure) | Standard deviation ($\sigma$) | Attribute combinations with higher $\sigma$ are prioritized over combinations with lower $\sigma$. $\sigma$ is calculated using the number of items in each group/timestamp for a dimension and bins of values in a measure. |
| Filter | (measure, value range), (dimension, categories), (dimension, time range) | Top N, Pearson's correlation coefficient ($r$), Standard deviation ($\sigma$) | For categorical dimensions, select groups/categories with highest values for the item count or measure in the active visualization (for bar charts) and $\sigma$ (for line charts). For measures and temporal dimensions, first, identify groups using quartile ranges. Then, compute $|r|$ or $\sigma$ for the measures in the active visualization. Numeric and temporal filters do not get suggested for bar charts since bar charts show aggregated information and the effects of these filters may not be perceptually directly evident. |

Figure 8

| | |
|---|---|
| Distribution | Show the spread of values for Rotten Tomatoes Rating. How many items exist for each Creative Type? |
| Group | Count items by Major Genre. What is the distribution of values for Production Budget? |
| | What is the average Production Budget by Major Genre? Compare average Durations across Content Ratings. |
| | On average, what is the Production Budget for each Major Genre? Show total Worldwide Gross by Creative Types. |
| Correlate | How does IMDB Rating vary with Production Budget? How are Duration and IMDB Rating correlated? |
| | Show the relationship between Worldwide Gross and Production Budget. How about IMDB Rating and Rotten Tomatoes Rating? |
| Trend | Show the trend for Worldwide Gross instead. What is the trend of IMDB Rating over the years? |
| | How does Production Budget vary over Release Years? Plot changes in Rotten Tomatoes Ratings over time. |
| Filter | Just show Adventure, Action, and Musical. Focus on the spike between 1996 and 1999. |
| | Just show the top 3 groups. Focus on high Production Budget. Drill down into PG-13. |
| Aggregation | Show the total Worldwide Gross instead. Show the total values instead. How about the mean of values? |

Figure 11

CONTEXTUAL UTTERANCE RECOMMENDATIONS FOR NATURAL LANGUAGE INTERFACES THAT SUPPORT CONVERSATIONAL VISUAL ANALYSIS

RELATED APPLICATIONS

This application claims priority to U.S. Provisional Patent Application No. 63/172,013, filed on Apr. 7, 2021, titled "Contextual Utterance Recommendations for Natural Language Interfaces that Support Conversational Visual Analysis," which is incorporated by reference herein in its entirety.

This application is related to the following patent applications and publications, each of which is incorporated by reference herein in its entirety:
(i) U.S. patent application Ser. No. 16/166,125, filed Oct. 21, 2018, titled "Determining Levels of Detail for Data Visualizations Using Natural Language Constructs";
(ii) U.S. patent application Ser. No. 16/234,470, filed Dec. 27, 2018, titled "Analyzing Underspecified Natural Language Utterances in a Data Visualization User Interface";
(iii) Hoque et al., "Applying pragmatics principles for interaction with visual analytics," *IEEE transactions on visualization and computer graphics* 24, 1 (2017), 309-318.

TECHNICAL FIELD

The disclosed implementations relate generally to data visualization and more specifically to systems, methods, and user interfaces for interactive visual analysis of a data set.

BACKGROUND

Data visualization applications enable a user to understand a data set visually. Visual analyses of data sets, including distribution, trends, outliers, and other factors are important to making business decisions. Some data sets are very large or complex, and include many data fields. Some data elements are computed based on data from a selected data set. Various tools can be used to help understand and analyze the data, including dashboards that have multiple data visualizations and natural language interfaces that help with visual analytical tasks.

The use of natural language expressions to generate data visualizations provides a user with greater accessibility to data visualization features, including updating the fields and changing how the data is filtered. A natural language interface enables a user to develop valuable data visualizations with little or no training.

SUMMARY

Natural language interfaces (NLIs) have become a prevalent medium for conducting visual data analysis. NLIs enable users with varying levels of analytic experience to ask questions of and interact with their data. This interest in NLIs is driven by the fact that natural language allows users to freely express their data-driven goals and questions without needing them to translate their intentions to interface actions (e.g., manually specifying mappings between data attributes and visual encodings). Recent advances in natural language processing and machine learning have resulted in considerable improvements in NLIs with respect to understanding natural language. NLIs for visual analysis have matured to support a range of analytic intents while also tackling challenges such as ambiguity and under-specification in natural language.

Despite improvements in understanding natural language, however, from a user standpoint, formulating utterances (e.g., a natural language command, statement, query, question, or instruction that one may issue to an NLI) during an analytical workflow remains a challenging task for two key reasons. First, analytical query formulation involves the need to understand the characteristics of the underlying data domain and potential patterns to investigate (e.g., general value distributions, correlations). A lack of analytic guidance during this process can interfere with users developing an accurate sense of progress towards their analysis goals. Second, practical limitations of a system's natural language understanding capabilities require users to phrase or adjust their utterances in a way that the system can best interpret them. Without a clear understanding of the system's interpretation capabilities, users often end up "guessing" utterances, thus making them more prone to system failures.

Accordingly, there is a need for improved systems and methods that support interactions with visual analytical systems. The present disclosure describes a data visualization system that includes a mixed-initiative natural language interface—also referred to herein as "Snowy"—that presents natural language utterances as recommendations (e.g., utterance recommendations) during visual data analysis. The utterance recommendations can guide visual analysis while implicitly helping users learn and discover the system's natural language understanding capabilities.

In accordance with some implementations of the present disclosure, Snowy generates and recommends utterances for visual analysis based on a combination of data "interestingness" metrics and language pragmatics. Snowy populates its recommendations with contextually relevant data entities (e.g., attributes and values) and phrases the recommendations to highlight the linguistic variations supported by an underlying natural language understanding module. Snowy provides contextual utterance recommendations that can not only guide visual analysis, but also help people gain awareness of the system's natural language interpretation capabilities. This combination of features enables Snowy to provide analytic guidance that goes beyond existing visualization recommendation tools that tend to only focus on perceptual features and/or data interestingness but do not consider natural language input and natural language discovery-oriented recommendation tools that consider the interface and language context but offer no guidance for visual analysis.

In accordance with some implementations of the present disclosure, Snowy operationalizes the idea of generating and presenting utterance recommendations for conversational visual analysis and recommends (1) follow-up utterances that promote a user's active analytic context (e.g., the most recent utterance and the active chart) and/or (2) utterances that complement the user's historical actions and serve as new inquiries to look at other interesting and/or underexplored aspects of the data.

Some implementations of the present disclosure present an approach to generate utterance recommendations for visual analysis through a combination of data interestingness metrics (e.g., the number of times an attribute has been visualized and correlations between attributes in the underlying dataset) as well as language pragmatics (e.g., terms and entities used in preceding utterances).

Accordingly, such methods and interfaces reduce the cognitive burden on a user and produce a more efficient human-machine interface. For battery-operated devices, such methods and interfaces conserve power and increase the time between battery charges. Such methods and interfaces may complement or replace conventional methods for visualizing data. Other implementations and advantages may be apparent to those skilled in the art in light of the descriptions and drawings in this specification.

In accordance with some implementations, a method is performed at a computing device having a display, one or more processors, and memory storing one or more programs configured for execution by the one or more processors. The method includes receiving user selection of a data source. The method includes in accordance with the user selection of the data source, generating one or more initial natural language utterances according to metrics of data fields in the data source and/or previous user interaction with the data source. Each of the initial natural language utterances corresponds to a respective suggestion to guide visual analysis of the data source. The method includes displaying the initial utterances in a graphical user interface. The method includes receiving user selection of a first initial utterance of the initial utterances. The method also includes, in response to the user selection of the first initial utterance, (i) generating a first data visualization in accordance with one or more data fields and/or analytical operations specified in the first initial utterance, (ii) displaying the first data visualization, (iii) generating updated natural language utterances in accordance with the first initial utterance and the first data visualization; and (iv) displaying the updated utterances with the first data visualization.

In some implementations, the method includes, after displaying the first data visualization, determining a context state according to one or more of: the first data visualization, data marks of the first data visualization, the first initial utterance, and the previous user interaction with the data source. The one or more updated natural language utterances are generated further in accordance with the determined context state.

In some implementations, generating the updated natural language utterances further includes: determining a plurality of utterance types corresponding to the updated utterances based on the determined context state and ranking the plurality of utterance types to determine a subset of utterance types. The method further includes for each utterance type in the subset, parameterizing the respective utterance type with one or more respective data fields and/or aggregation functions, and forming a respective updated natural language utterance by linguistically realizing the respective utterance type.

In some implementations, the method includes storing the previous user interaction as an interaction score.

In some implementations, the interaction score includes a plurality of attribute scores. Each of the attribute scores corresponding to a respective data field. The method further includes, for each of the data fields, computing the respective attribute score for the data field by determining the number of times in the previous user interaction the data field has been mapped to visual encodings and/or the number of times in the previous user interaction data values of the data field have been applied as filters.

In some implementations, the interaction score includes a plurality of intent scores. Each of the intent scores corresponds to a respective intent type. The method further includes determining a corresponding intent type for the first natural language utterance and incrementing the intent score of the corresponding intent type.

In some implementations, the respective intent type is one of: correlate, group, trend, distribution, aggregation, or filter.

In some implementations, the updated natural language utterances include a follow-up utterance. The follow-up utterance corresponds to a suggestion to perform an analytical operation on a first data field that is specified in the first data visualization.

In some implementations, the first initial data visualization specifies a first aggregation operator. The follow-up utterance specifies a second aggregation operator, distinct from the first aggregation operator.

In some implementations, the follow-up utterance specifies a second data field, distinct from the first data field.

In some implementations, the first data visualization includes one or more first data fields. The one or more updated natural language utterances include a new utterance. The new utterance corresponds to a suggestion to perform an analytical operation on a second data field, distinct from the one or more first data fields.

In some implementations, the method includes determining one or more analytic tasks based on previous user interactions with the data source. The new utterance includes a first analytic task that is distinct from the one or more determined analytic tasks.

In some implementations, the method further includes, after receiving the user selection of the first initial utterance, displaying the first initial utterance in a natural language input box of the graphical user interface.

In some implementations, the method includes receiving user modification of the first initial utterance in the natural language input box. The method also includes in accordance with the user modification, generating and displaying an updated data visualization.

In some implementations, the first initial utterance specifies two data fields from the data source.

In some implementations, the two data fields correspond to a first data field and a second data field. The method further includes designating the first data field as a first encoding of the first data visualization and designating the second data field as a second encoding of the first data visualization. The first encoding is distinct from the second encoding.

In some implementations, the graphical user interface includes an encoding panel having a plurality of encoding labels. The method further includes updating a first encoding label of the plurality of encoding labels to include a field name corresponding to the first data field, and updating a second encoding label of the plurality of encoding labels to include a field name corresponding to the second data field.

In some implementations, a computing device includes a display, one or more processors, memory, and one or more programs stored in the memory. The programs are configured for execution by the one or more processors. The one or more programs include instructions for performing any of the methods described herein.

In some implementations, a non-transitory computer-readable storage medium stores one or more programs configured for execution by a computing device having one or more processors and memory. The one or more programs include instructions for performing any of the methods described herein.

Thus methods, systems, and user interfaces are disclosed that generate and display utterance recommendations during visual data analysis, to guide visual analysis and enable users to discover the system's natural language understanding capabilities.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

FIG. 6 illustrates a subset of the underlying grammar for a natural language processing system and its production rules, in accordance with some implementations FIG. 8 illustrates parameter selection logic that is applied by a natural language processing system, in accordance with some implementations.

FIG. 11 illustrates example utterance recommendations for different intent types that are generated by a natural language processing system, according to some implementations FIGS. 12A-12U provide a series of screen shots illustrating user interactions with a "Movies" dataset via a graphical user interface.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

A. System Overview

1. User Interface

Figure 1:
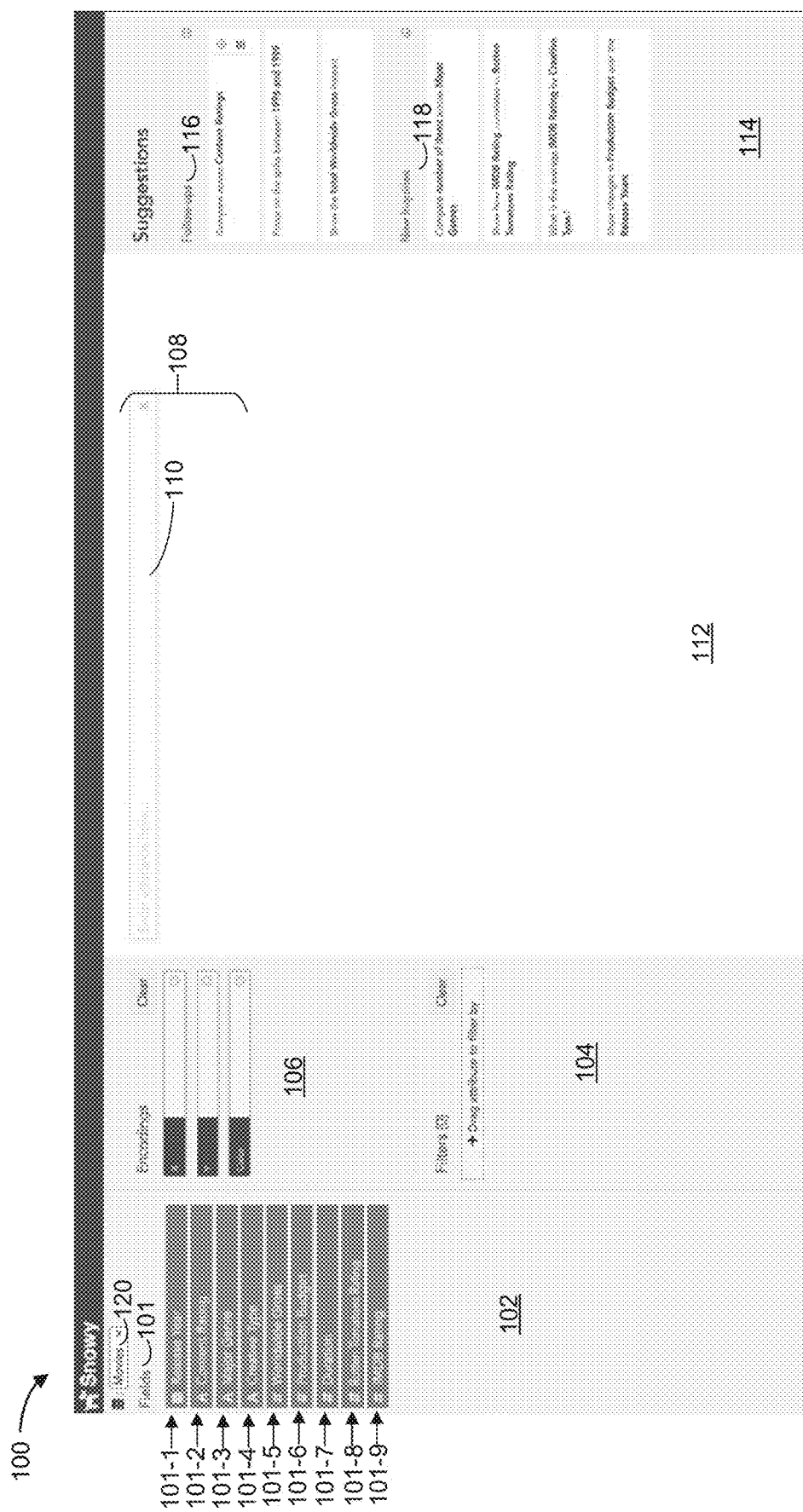
FIG. 1 shows a graphical user interface used in some implementations.

FIG. 1 shows a graphical user interface (GUI) 100 that is displayed on a computing device 200 according to some implementations. In some implementations, the GUI 100 is used in conjunction with a mixed-initiative natural language processing system 150 (also referred to herein as "Snowy") that recommends natural language utterances to guide visual analysis. In some implementations, Snowy is implemented as a web-based application and is developed using Python, HTML/CSS, and JavaScript. Visualizations in the tool are specified and created using Vega-Lite.

In some implementations, the GUI 100 includes an attribute panel 102 for displaying attributes (e.g., data fields) of a data source. In the example of FIG. 1, the attribute panel 102 displays a subset of data fields 101 corresponding to a "Movies" dataset 120 (e.g., a data source 240). The data fields 101 include temporal attributes (e.g., "Release Year" 101-1), categorical attributes (e.g., "Content rating" 101-2, "Major Genre" 101-3, and "Creative Types" 101-4), and numerical attributes (e.g., "Worldwide gross" 101-5, "Production Budget" 101-6, "Duration" 101-7, "Rotten Tomatoes Rating" 101-8, and "IMDB Rating" 101-9).

In some implementations, the GUI 100 includes a filters panel 104, which enables users to perform one or more filter operations, such as filtering data rows of a dataset to a subset of data rows, filtering data fields of a dataset to a specific data field, and/or filtering data values of a data field to a specific value.

In the example of FIG. 1, the GUI 100 includes an encodings panel 106. In some implementations, Snowy supports encoding channels (e.g., x, y, and color) and mark types (e.g., bar, point, or line), allowing users to specify and interact with basic set of visualizations including bar charts, line charts, and scatterplots. In some implementations, during manual view specification, Snowy selects a default visualization using a simplified version of the Show Me system, employing similar rules to determine mark types based on the mappings between the visual encodings and attribute data types (e.g., showing a scatterplot if two quantitative attributes are mapped to the x y-channels, and showing a line chart if a temporal attribute is visualized on the x-axis with a quantitative attribute on the y-axis). The Show Me system is described in U.S. Pat. No. 8,099,674, entitled "Computer Systems and Methods for Automatically Viewing Multidimensional Databases," which is incorporated by reference herein in its entirety.

In some implementations the GUI 100 includes a natural language input and feedback region 108, which includes a natural language input command box 110 for receiving natural language utterances from a user and a feedback region (e.g., under the command box 110) for displaying system-generated responses (e.g., feedback) to the user.

With continued reference to FIG. 1, in some implementations, the GUI 100 includes a visualization canvas 112 for displaying data visualizations. The GUI 100 also includes a recommendations panel 114 (e.g., a Suggestions panel), which displays recommendation utterances that are generated by the system. As an example, for an input utterance "Show average Worldwide Gross by Major Genre", Snowy creates a bar chart as a response and updates the encodings panel 106 (e.g., assigning "Major Genre" as the x-encoding and "Worldwide Gross" as the y-encoding) to reflect the bar chart. Simultaneously, Snowy also generates and presents several utterance recommendations to suggest modifying the current chart (e.g., Follow-ups 116), as well as for exploring other aspects of the dataset (e.g., New Inquiries 118). A user can click a recommendation to issue it as an input utterance, or right-click to copy the recommendation's text into the input command box 110 and edit it further.

Figure 2:
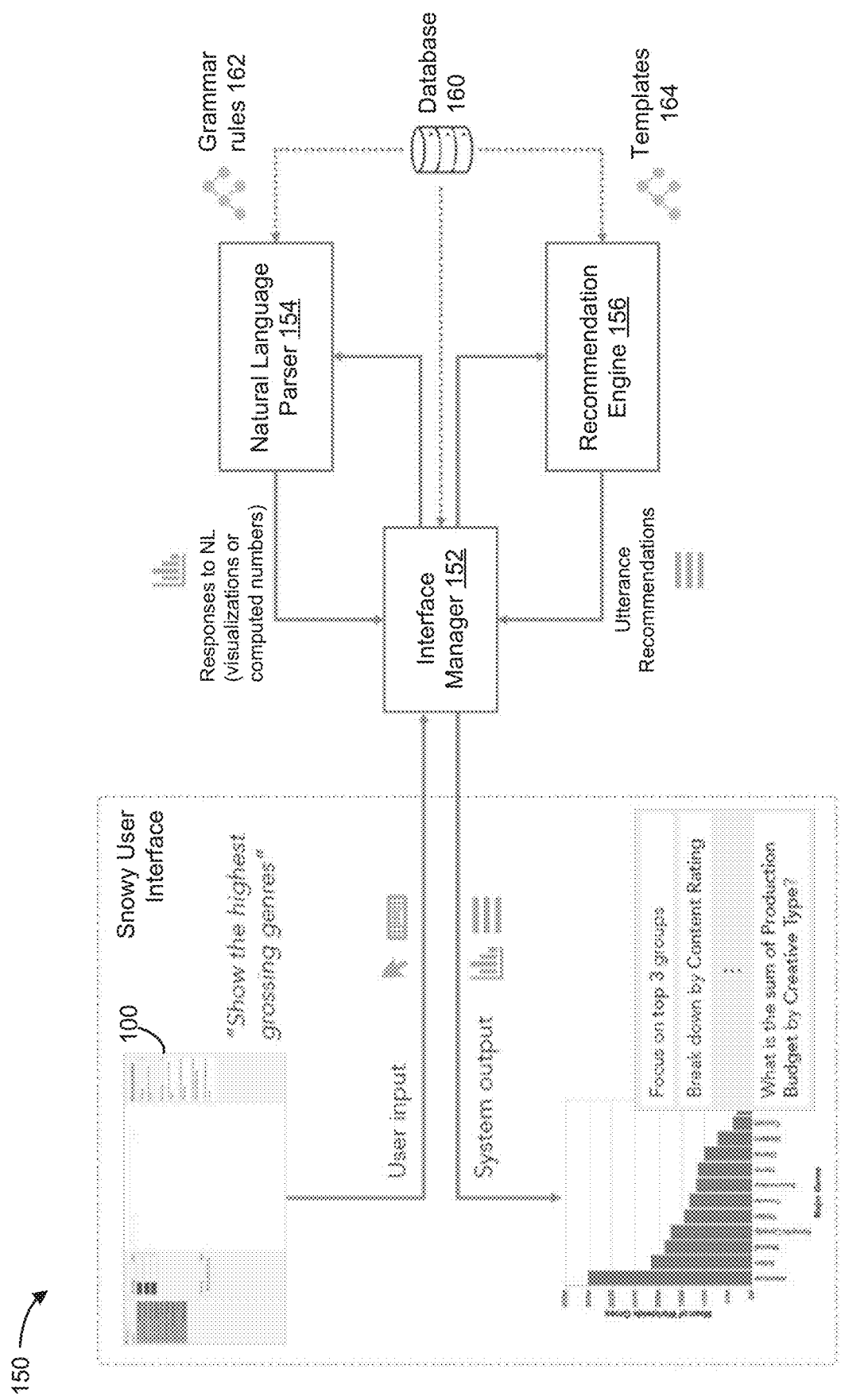
FIG. 2 illustrates an example natural language processing system ("Snowy") in accordance with some implementations.

FIG. 2 illustrates a natural language processing system 150 (e.g., "Snowy") according to some implementations. In some implementations, Snowy is part of a data visualization application 230 that includes the GUI 100 described in FIG. 1. In some implementations, Snowy executes as part of a data visualization application 230 and enables visual analysis of datasets. In some implementations, Snowy is a standalone natural language processing system, which can be integrated with any data visualization application. In some implementations, Snowy includes an interface manager 152, a natural language parser 154, and an utterance recommendation engine 156. Each of these features is discussed in greater detail below.

2. Interface Manager

According to some implementations of the present disclosure, Snowy is a context-sensitive recommendations interface, which employs an action-reaction design, where user interactions (e.g., with the GUI 100) causes the interface manager 152 to react and update based on the actions that the user makes.

In some implementations, user actions that drive recommendations in Snowy include user-defined specifications in the form of manual inputs from a user and/or user interactions with the GUI 100. For example, a user can specify x-, y-, and/or color encodings for a data visualization through drop-and-drag operations (e.g., by dragging data fields from the attribute panel 102 and placing them in the encodings panel 106). As another example, a user can apply one or more filters to a dataset by dragging data fields from the attribute panel 102 and placing them in the filter panel 104. As another example, a user can input (e.g., by typing or through voice dictation) a natural language query or utterance into the natural language input command box 110, or select recommended utterances, and/or select marks in an active data visualization (e.g., that is presently displayed in the visualization canvas 112). As the user interacts with the tool, Snowy tracks the actions and maintains a context state 340 to drive the system's utterance recommendations.

In some implementations, Snowy models the context state object as a combination of: (1) the active chart and mark selections, (2) the active utterance, and/or (3) a user's data exploration history (e.g., stored in a data exploration history log 338 in a database 160). The first two are directly captured from the visualization canvas 112 and the natural language input box 110, respectively. In some implementations, a user's data exploration history is stored as interaction scores corresponding to data fields (e.g., attributes), data values of data fields, and the various analytic intents supported in Snowy.

In some implementations, Snowy supports analytic intent types such as distribution, group, correlation, trend, filter, and aggregate. While this is not a definitive general model for capturing and understanding user interest, it helps track the user's coverage in the context of data exploration, enabling the system to promote depth- and/or breadth-oriented exploration through its recommendations.

In some implementations, interaction scores for data fields (e.g., attributes) and data values of data fields are computed by tracking the number of times a respective data field has been mapped to visual encodings or the number of times a respective data value of a data field is applied as a filter.

In some implementations, interaction scores for intents (also known as "intent scores") can be incremented in three scenarios. First, user selection of an utterance recommendation increments the intent score for the recommendation's corresponding intent. For example, user selection of an utterance recommendation "Drill down into PG-13" increments (e.g., increases by 1) the intent score for the intent type corresponding to "filter." Second, when natural language utterances are manually entered (e.g., in the natural language input box 110), Snowy infers the underlying intent from the input utterance and increments the score based on its confidence in the interpretation. For example, an input utterance like "Show correlation between IMDB Ratings and Production Budget" leads to a higher increment for the "correlation" intent type compared to the utterance "Show IMDB Ratings against Production Budget," since there is an explicit reference to the intent in the first utterance versus an implicit intent in the second. The third scenario applies specifically for the "filter" intent, whereby the intent score for the "filter" intent type is also incremented if new filters are manually applied via the filter panel 104 in the GUI 100.

Figure 5:
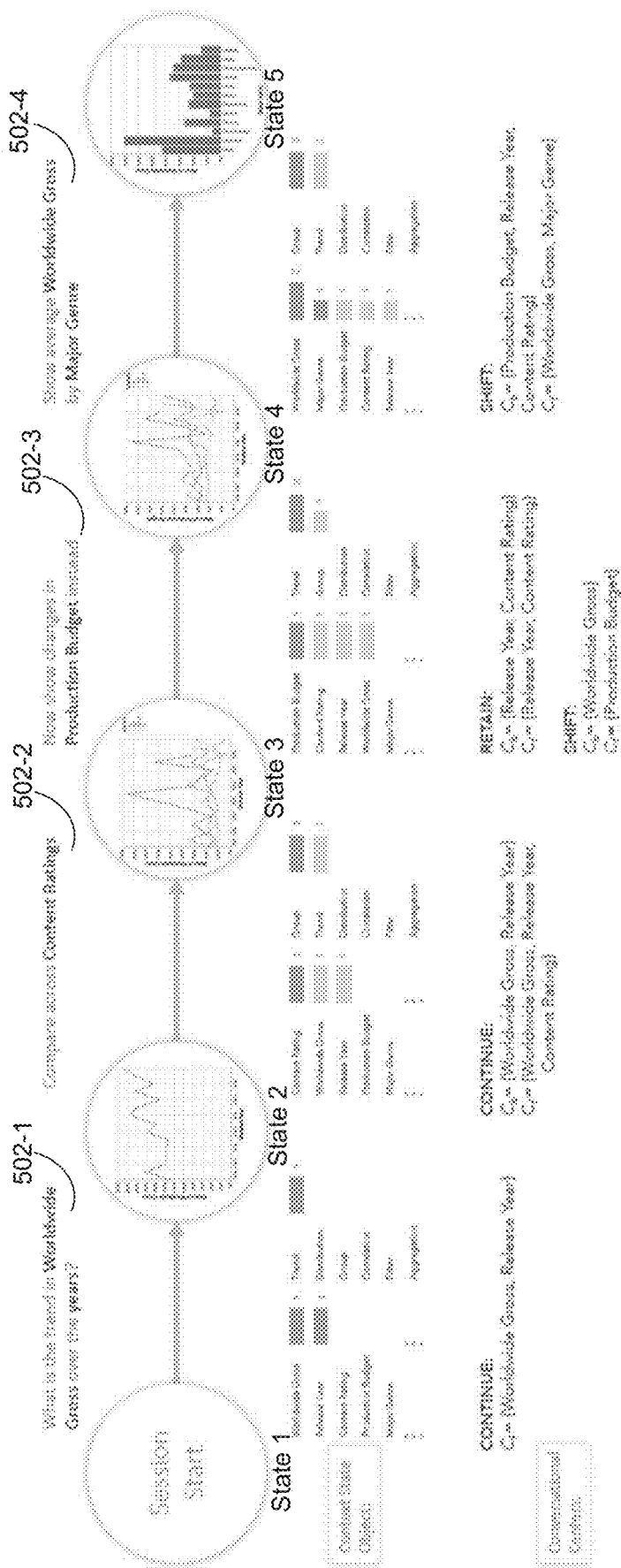
FIG. 5 illustrates progression of a context state and conversational centers through the initial stages of a usage scenario, according to some implementations.

FIG. 5 illustrates progression of a context state and conversational centers through the initial stages of a usage scenario, according to some implementations. Each of the utterances 502-1, 502-2, 503-3, and 502-4 in FIG. 5 is an utterance recommendation generated by Snowy and selected by the user.

In the example of FIG. 5, between the first state (e.g., State 1) and the third state (e.g., State 3), two utterance recommendations (e.g., corresponding to utterance 502-1 "What is the trend of Worldwide Gross over the years?" and utterance 502-2 "Compare across Content Ratings") were selected by the user. In response to the user selection, Snowy updates the interaction scores. For example, in response to the user selection of the utterance 502-1 "What is the trend of Worldwide Gross over the years?", which includes the data fields "Worldwide Trend" and "Release Year" and includes the intent type "trend," Snowy increments the score for the data fields "Worldwide Trend" 101-5 and "Release Year" 101-1 by one, and increments the intent score for the intent type "trend" by one. In response to the user selection of the utterance 502-2 "Compare across Content Ratings", Snowy increments the score for the data field "Content Rating" 101-2 by one and increments the intent score corresponding to the intent type "group" by one.

3. Natural Language Parser

As illustrated in FIG. 2, Snowy includes a natural language parser 154 for interpreting natural language utterances, in accordance with some implementations.

In some implementations, the natural language parser 154 is implemented using an open-source Natural Language for Data Visualization (NL4DV) toolkit, which takes a dataset and an utterance corresponding to that dataset as inputs, and returns a JSON object that includes: (i) the data fields and intents (e.g., intent types) referred to in the utterance and (ii) an ordered list of Vega-Lite specifications that can be presented in response to the input utterance. Information about the NL4DV system is available at 414dv.github.io/nl4dv/. While NL4DV provides basic interpretation capabilities and the ability to specify a visualization through natural language, it does not support conversational interaction through follow-up and deictic utterances or perform statistical computations (e.g., computing differences or correlation coefficients). According to some implementations of the present disclosure, Snowy extends NL4DV's default grammar with a set of production rules augmented with both syntactic and semantic predicates based on analytical expressions that correspond to different intents (e.g., group or correlation), found in mainstream systems like Tableau's VizQL and Ask Data. Details about Tableau's VizQL are provided in U.S. Pat. No. 7,089,266, entitled "Computer Systems and Methods for the Query and Visualization of Multidimensional Databases," which is incorporated by reference herein in its entirety. Details about Tableau's "Ask Data" system are provided in several patent applications, including U.S. patent application Ser. No. 17/063,663, entitled "Visually Correlating Individual Terms in Natural Language Input to Respective Structured Phrases Representing the Natural Language Input," which is incorporated by reference herein in its entirety.

Snowy also includes support for follow-up utterances through the addition of a "follow-up' grammar rule that is triggered by pragmatic markers. Pragmatic markers are linguistic cues that convey the intentionality of a follow-up utterance in reference to the current context. In some implementations, the pragmatic markers are adverbs (e.g., "also", "how about") or referentials (e.g., "this", "that"), which signal a user's potential communicative intention of following up from a previous conversation state.

FIG. 6 illustrates a subset of the underlying grammar for Snowy with its production rules (e.g., grammar rules 162), specified for the various analytical intents and follow-up utterances, in accordance with some implementations. In the grammar, fields that cannot be aggregated (except for counting) are called dimensions (e.g., dimension data fields) and fields that can be aggregated are called measures (e.g., measure data fields). Typically, dimensions include categorical data fields and/or temporal data fields, while measures (e.g., quantitative data fields) are fields that are aggregated within groups defined by the set of all dimensions. In some implementations, the grammar also includes synonyms, date, time, and place terminals.

In some implementations, to support follow-up utterances, Snowy applies principles of pragmatics by modeling the interactions and recommendation behaviors as a conversation. In some implementations, Snowy incorporates the conversational interaction model for visual analysis proposed by Hoque et al., "Applying pragmatics principles for interaction with visual analytics," *IEEE transactions on visualization and computer graphics* 24, 1 (2017), 309-318, which is incorporated by reference herein in its entirety. This model builds upon a conversational centering approach, where utterances are divided into constituent conversational segments, embedding relationships that may hold between segments. A center C refers to those entities serving to link that utterance to other utterances in the conversation. Each utterance $U_n$ (1≤n<m) in the conversation converse is assigned a set of forward-looking centers, $C_f(U_n,$ converse) referring to the current focus of the conversation. Each utterance other than the initial utterance is assigned a set of backward-looking centers, $C_b$ ($U_n$, converse), referring to the previous state of the conversation. The forward and backward-looking centers consist of data fields and data values, visual properties, and analytical intent (e.g., intent types, such as "correlation" and "trend").

In some implementations, transitions from the backward-looking center to the forward-looking center are realized through three types of transitions, namely "Continue", "Shift", and "Retain":

Continue: Transition that continues the context from the backward-looking center to the forward-looking one, while potentially adding new entities.

Retain: Transition retains the context from the backward-looking center in the forward-looking one without adding additional entities to the forward-looking one.

Shift: Transition shifts or changes context from the previous one.

Based on this transition model, given an utterance $U_n$, the natural language parser 154 responds by executing a series of analytical functions derived from the forward-looking centers $C_f(U_n,$ DS).

FIG. 5 illustrates these different types of transitions during a conversation. In the example of FIG. 5, the user selects or inputs a first utterance recommendation 502-1 (e.g., "What is the trend in Worldwide Gross over the years?"), thereby setting the conversational center to the data fields "Worldwide Gross" 101-5 and "Release Year" 101-1. Subsequently, the user selects or inputs a second utterance recommendation 502-2 (e.g., "Compare across Content Ratings"), which is interpreted by Snowy as a request for a comparison across different groups under the "Content rating" data field. Based on the user selection of the second utterance recommendation 502-2, Snowy adds a data field "Content Rating" 101-2 to the current center, resulting in a continue transition. The third utterance 502-3 ("Now show changes in Production Budge instead") includes a pragmatic marker (e.g., "instead") and requests for a change in the attribute (e.g., data field) shown on the active data visualization and indicates interest in the trend intent. Referring to the existing center, Snowy swaps out the "Worldwide Gross" 101-5 measure for another measure "Production Budget" 101-6, performing a shift transition while retaining the other two attributes "Release Year" 101-1 and "Content Rating" 101-2. Finally, in response to user selection (or user input) of a fourth utterance 502-4 (e.g., "Show average Worldwide Gross by Major Genre"), Snowy switches to a new set of data fields and intent (group), thus applying a Shift transition to shift the conversation center to the data fields "Worldwide Gross" 101-5 and "Major Genre" 101-3, as the system creates a new bar chart.

4. Recommendation Engine

FIG. 2 also illustrates, in some implementations, that the natural language processing system 150 includes a recommendation engine 156 for generating contextual utterance suggestions (e.g., utterance recommendations).

In some implementations, Snowy generates the recommendations by considering a combination of patterns in the underlying data (e.g., strong correlations, or variations in data values over a temporal data field), a user's session history (e.g., data fields considered, or filters applied), and any active user interactions with the GUI 100. User interactions that can trigger utterance recommendations include issuing a natural language utterance (e.g., query), updating an existing data visualization through the manual view specification (e.g., user interactions with, or input to, the filter panel 104, the encodings panel 106, or the natural language input box 110), as well as directly selecting marks on the active visualization, a behavior commonly referred to as deictic referencing.

Figure 7:
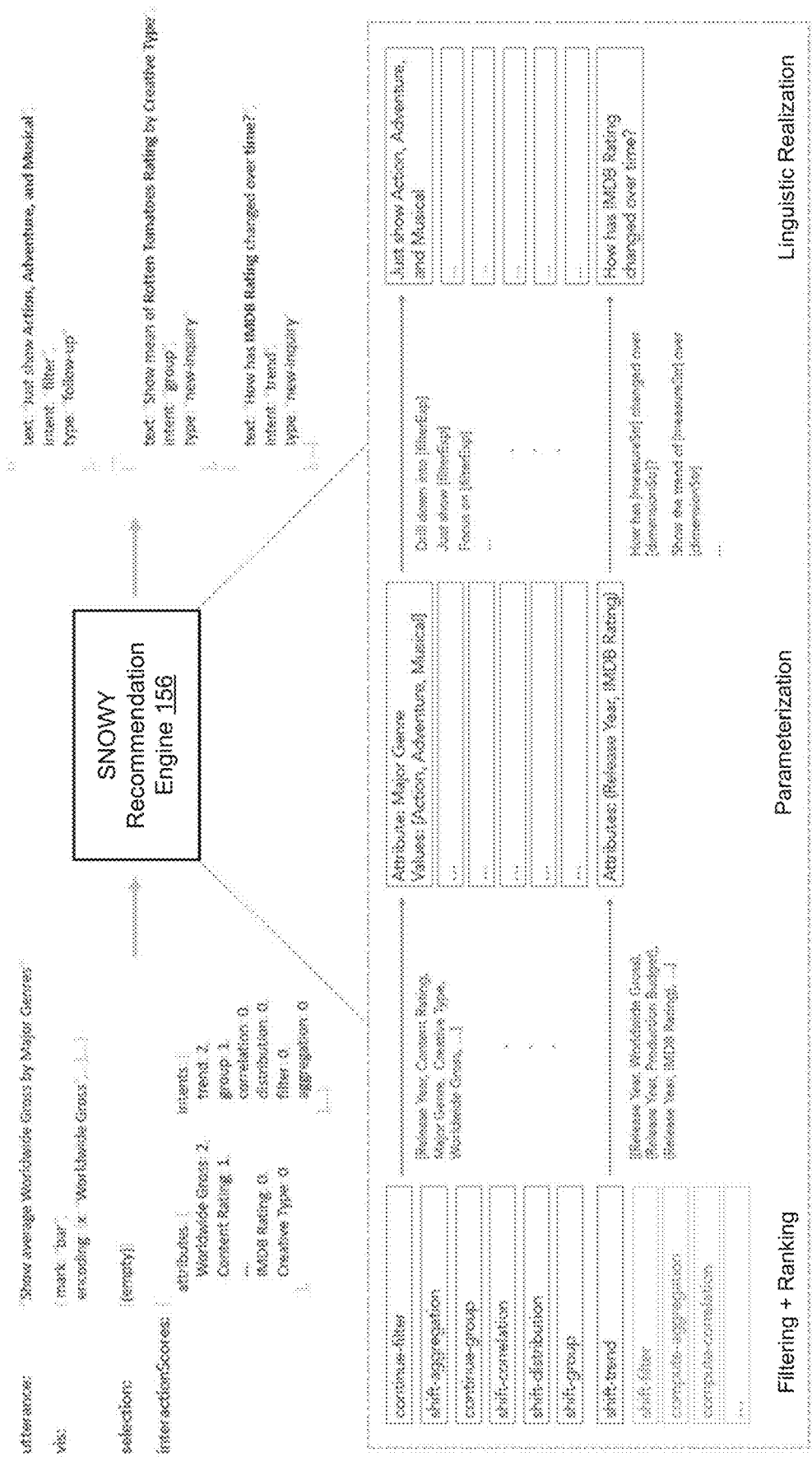
FIG. 7 illustrates a recommendation engine 156 that is included in a natural language processing system, according to some implementations

FIG. 7 provides an overview of a recommendation engine 156 that is included with Snowy, according to some implementations. The recommendation engine 156 takes the context state object input from the interface manager 152 and returns an ordered list of utterance objects. The utterance objects can contain a recommendation text along with other meta-information such as an utterance type (e.g., "Follow-up" or "New Inquiry") and the associated intent (e.g., "Filter" or "Group").

In some implementations, given a context state, Snowy performs three steps to generate utterance recommendations: (a) filtering and ranking, (b) parameterization, and (c) linguistic realization.

a. Filtering and Ranking.

In the "Filtering and Ranking" step, Snowy identifies the types of recommendations to be shown. In some implementations, Snowy uses the context state to determine which types of utterances it should recommend at any point in time. Specifically, if one or more marks are selected in the active visualization (e.g., a data visualization that is currently displayed in the visualization canvas 112), Snowy prioritizes deictic utterances and checks if it can recommend utterances based on the current data visualization type and selection.

For example, upon detecting multiple selected marks in a scatterplot, Snowy can generate and display "What are the average values?" and "What is the correlation between these points?" as follow-up utterance recommendations since computing averages and correlations are common analytic tasks for scatterplots.

Alternatively, if there are no mark selections but there is an active data visualization being displayed in the visualization canvas 112, Snowy checks for follow-up utterances to recommend. Follow-up recommendations typically promote continue or shift transitions through utterances that correspond to: (i) adding one or more new data fields to the data visualization if there are unused encoding channels, (ii) changing an aggregation level of the existing data visualization, and/or (iii) adding filters to filter data values of a data field of an existing data visualization to a subset of values.

In some implementations, in addition to generating and displaying follow-up utterances for an active chart (e.g., data visualization) or selection, Snowy also generates new inquiry recommendations to suggest alternative analytic paths for users to consider. These recommendations focus on shift transitions in the conversational interaction model and map to one or more analytic intents (e.g., intent types).

In some implementations, after shortlisting recommendations types, Snowy orders them such that recommendations mapping to the least covered intent-types (e.g., determined using the context state object) precede other recommendations. This ordering helps promote breadth in analytic querying and also tries to make users aware of potentially underexplored system capabilities given their prior interactions. In the context of FIG. 7, this ordering logic results in continue-filter and shift-aggregation being shown before continue-group since the user had previously issued a continue-group utterance (e.g., "Compare trends across Content Ratings" in FIG. 5).

b. Parameterization

In the "Parameterization step," Snowy parameterizes the shortlisted recommendations (e.g., determined from the "Filtering and Ranking") with appropriate data and analytic features including data fields (e.g., "Content Rating" 101-2, "Worldwide Gross" 101-5), data values (e.g., "PG-13" is a data value of the data field "Content Rating" 101-2, "Action and Adventure" is a data value of the data field "Major Genre" 101-3, and "1996-1999" is a range of data values for the data field "Release Year" 101-1), and aggregation functions (e.g., average, median, sum, or difference).

In some implementations, Snowy uses a combination of statistical metrics derived from the underlying data and the interaction scores in the context state object to select the recommendation parameters. FIG. 8 summarizes parameter selection logic that Snowy applies, to select parameters for different types of intents. In some implementations, as illustrated in FIG. 8, Snowy applies statistical functions (e.g., Pearson's correlation coefficient and standard deviation), which are similar to those in prior work on insight-based visualization recommendation systems.

In some implementations, the parameter selection logic that is illustrated in FIG. 8 is driven based on statistical metrics derived directly from the underlying data. However, since the dataset remains constant throughout a session, if only these metrics were used to select parameters, the recommendations may get repetitive if users have already investigated a suggested combination of attributes. To overcome this challenge and promote breadth in data exploration, besides "data interestingness" computed via the logic above, Snowy also incorporates prior interaction scores from the context map such that data fields and data values with lower scores get bumped up when selecting parameters.

Figure 9:
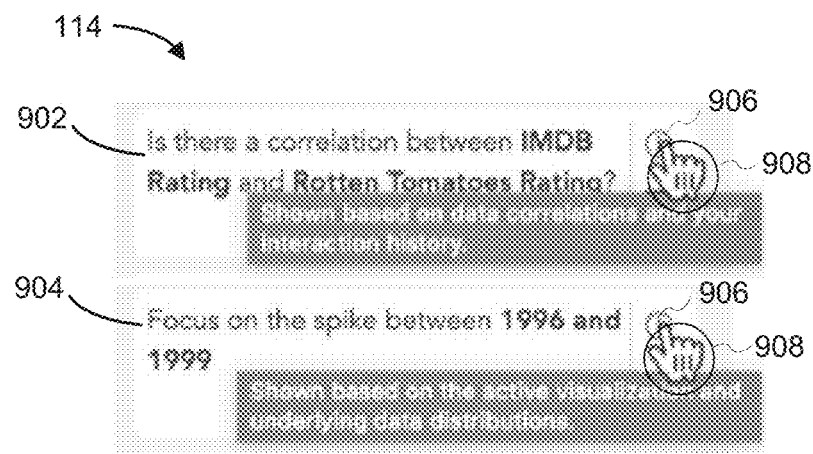
FIG. 9 illustrates a partial view of a recommendations panel 114 that includes two utterance recommendations, in accordance with some implementations.

For example, at the start of a user session, Snowy may recommend attributes (e.g., data fields) such as "Content Rating" 101-2, "Worldwide Gross" 101-5, and "Major Genre" 101-3 based on underlying user interaction data patterns. As the session progresses, Snowy may shift its recommendations to focus on data fields that the user has never or minimally investigated to promote data coverage. Although Snowy does not give users control over the parameter selection logic, it does provide a brief rationale for why recommendations are shown through tooltips in the user interface 100. FIG. 9 illustrates a partial view of the recommendations panel 114, which includes two utterance recommendations 902 and 904 generated by Snowy. Included with each of the utterance recommendations 902 and 904 is a tooltip 906, which, when hovered over (908) by a user, displays a brief explanation as to why the utterance recommendation is shown.

c. Linguistic Realization of Recommendations.

Once all the relevant parameters for the various recommendation types have been determined, they need to be combined together into well-formed natural language utterances. This process is called linguistic realization and involves ordering constituents of the recommendations and generating the right morphological forms (including verb conjugations and agreement).

In some implementations, Snowy employs a template-based approach for generating natural language utterance recommendations. Given that the application domain is a set of known analytical intents along with data fields and data values from the underlying data sources, the space of linguistic variations is relatively small and the outputs can be specified using templates 164. In some implementations, Snowy generates natural language utterance recommendations using an algorithm that maps non-linguistic input comprising data fields, data values, and intent from the parameterization process to a linguistic structure based on a set of pre-defined templates for each of the intent types. These templates contain gaps for the parameters and generate well-formed recommendation utterances when all the gaps have been replaced by linguistic structures that do not contain gaps.

In some implementations, a template T (e.g., which is implemented in Snowy) can be represented as $$T=(S,E,C,I) \qquad (1)$$

where I is an intent type; S is an abstract syntax tree (AST) for each analytical intent type I with open slots in it; E is a set of links to additional syntactic structures that are noun (NP), verb (VP), and prepositional phrases (PP) that are substituted in the gaps of S; and C is a set of analytical constraints on the applicability of S that are based on the type of I.

In some implementations, the interior nodes of S are non-terminal symbols (e.g., syntactic variables) whose gaps are recursively replaced by groups of terminal symbols (e.g., elementary strings in the utterance) according to T's production rules as well as synonyms and vocabulary terms based on an intermediate language ArkLang. Details of ArkLang can be found in U.S. patent application Ser. No. 16/166,125, filed Oct. 21, 2018, titled "Determining Levels of Detail for Data Visualizations Using Natural Language Constructs" and U.S. patent application Ser. No. 16/234,470, filed Dec. 27, 2018, titled "Analyzing Underspecified Natural Language Utterances in a Data Visualization User Interface," each of which is incorporated by reference herein in its entirety.

Figure 10:
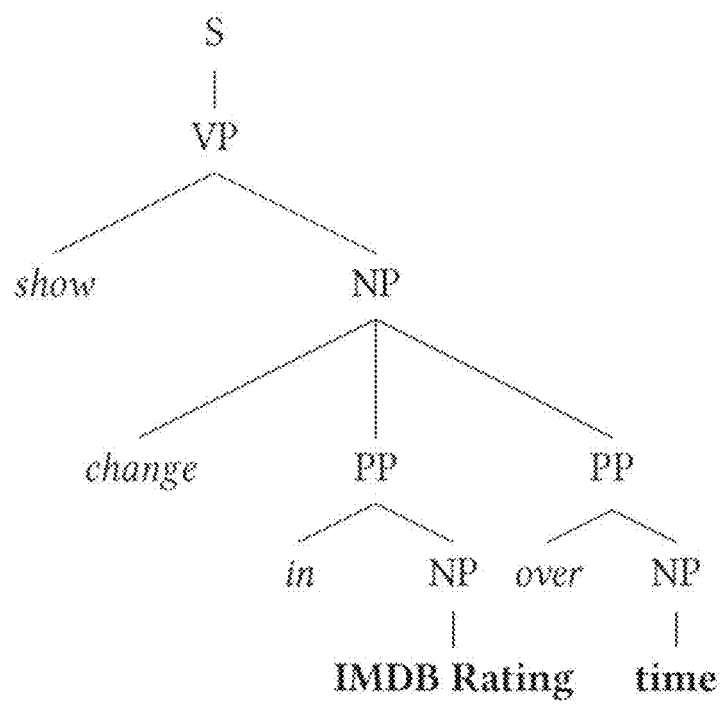
FIG. 10 illustrates an abstract syntax tree (AST) corresponding to a "trend" intent type, according to some implementations.

FIG. 10 illustrates an abstract syntax tree (AST) corresponding to the "trend" intent type according to some implementations. In this example, an utterance recommendation "Show change in IMDB Rating over time" is generated. The parameters lead to generation of partial NPs (noun phrases), with the slots for measureStr and dateTimeDimensionStr filled by "IMDB Rating" and "time" respectively. In this example, terminals of the AST are populated using the parameters passed to the trend intent (e.g., the measure "IMDB Rating" is applied as-is, whereas the dimension "Release Year" is replaced with "time"). The linguistic realization process generates all possible valid ASTs from the template T, using a bottom-up generative process. Each AST in this set is checked to see whether it is compatible with C. After the set of utterances is generated, nouns and verbs are inflected, where the base forms of the words are modified to be grammatically sound to account for plurality and tense.

FIG. 11 illustrates additional example utterance recommendations for different intent types that are generated by Snowy, in accordance with some implementations. As FIG. 11 shows, the recommendations exhibit a variety of linguistic variations to exemplify and help discover the capabilities of the underlying natural language parser 154. These variations include different phrasing patterns (e.g., questions and commands) and the use of colloquial terms in addition to the underlying data attributes and values (e.g., "over time" for temporal attributes, "spike" for a steep rise and fall trend in a line chart, and modifier terms like "low" or "high" when referring to numeric filters). Furthermore, some recommendations contain explicit references to data fields, data values, or intents and can be used as standalone utterances (e.g., "What is the average Production Budget across Major Genre?", "Just show Adventure, Action, and Musical".). However, other recommendations include implicit references to values and intents, and/or incorporate pragmatic markers to support conversational interaction (e.g., "Just show top 3 groups", "Now how about IMDB Rating and Rotten Tomatoes Rating?").

In some implementations, the choice of which AST is used for generating the recommendation is based on the current context state and the analytical constraints C. For example, consider a scenario in which the GUI 100 displays, as an active visualization, an unsorted bar chart of average Worldwide Gross by Major Genre. In this scenario, Snowy can display an utterance recommendation in the form of a filter recommendation (e.g., "Just show Adventure, Action, and Musical"), which explicitly lists the filter group. In another scenario, the context state is a sorted bar chart that is generated in accordance with user selection of an utterance recommendation "Show the highest grossing genres." Because the sorted bar chart includes an extremum token (e.g., "highest), Snowy provides a follow-up utterance recommendation "Just show the top 3 groups," as this phrasing suggests linguistic continuation and supports visual coherence by preserving the previous chart structure (e.g., sorted bar chart) to show the top 3 groups in the sorted chart.

While FIG. 11 shows examples for individual intents, as a session progresses and Snowy detects that the user has interacted with different intents individually. To make users aware of more advanced interpretation capabilities, Snowy can start recommending utterances that combine two or more intents (e.g., "How has the Production Budget changed over the Release Years for each Creative Type?", which combines the intent types "trend" and "group", or "Show the relationship between Rotten Tomatoes Rating and Duration by Major Genres", which combines the "correlation" and "group" intent types).

B. Block Diagrams

Figure 3:
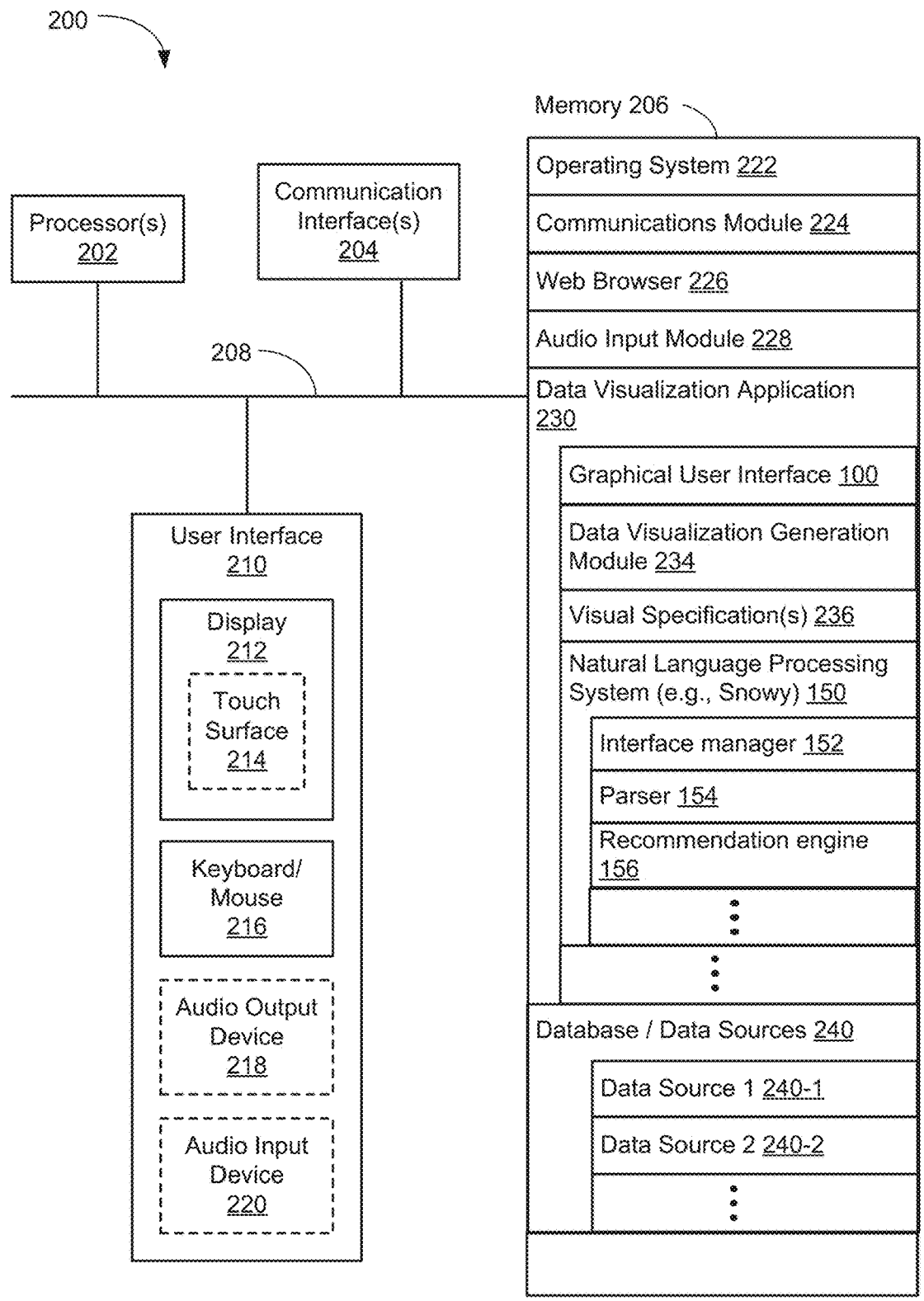
FIG. 3 is a block diagram of a computing device according to some implementations.

FIG. 3 is a block diagram illustrating a computing device 200, which can display the graphical user interface (GUI) 100, in accordance with some implementations. Various examples of the computing device 200 include a desktop computer, a laptop computer, a tablet computer, and other computing devices that have a display and a processor capable of running a data visualization application 230. The computing device 200 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The computing device 200 includes a user interface 210. The user interface 210 typically includes a display device 212. In some implementations, the computing device 200 includes input devices such as a keyboard, mouse, and/or other input buttons 216. Alternatively or in addition, in some implementations, the display device 212 includes a touch-sensitive surface 214, in which case the display device 212 is a touch-sensitive display. In some implementations, the touch-sensitive surface 214 is configured to detect various swipe gestures (e.g., continuous gestures in vertical and/or horizontal directions) and/or other gestures (e.g., single/double tap). In computing devices that have a touch-sensitive display 214, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone and voice recognition to supplement or replace the keyboard. In some implementations, the computing device 200 includes an audio input device 220 (e.g., a microphone) to capture audio (e.g., speech from a user).

The memory 206 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. In some implementations, the memory 206 includes one or more storage devices remotely located from the processors 202. The memory 206, or alternatively the non-volatile memory devices within the memory 206, includes a non-transitory computer-readable storage medium. In some implementations, the memory 206 or the computer-readable storage medium of the memory 206 stores the following programs, modules, and data structures, or a subset or superset thereof:

- an operating system 222, which includes procedures for handling various basic system services and for performing hardware dependent tasks;
- a communications module 224, which is used for connecting the computing device 200 to other computers and devices via the one or more communication network interfaces 204 (wired or wireless), such as the Internet, other wide area networks, local area networks, metropolitan area networks, and so on;

a web browser 226 (or other application capable of displaying web pages), which enables a user to communicate over a network with remote computers or devices;

an audio input module 228 (e.g., a microphone module), which processes audio captured by the audio input device 220. The captured audio may be sent to a remote server and/or processed by an application executing on the computing device 200 (e.g., the data visualization application 230);

a data visualization application 230, which generates data visualizations and related features. The application 230 includes a graphical user interface 100 (e.g., the GUI 100 illustrated in FIGS. 1 and 12A to 12U) for a user to construct visual graphics. For example, in some implementations, a user selects one or more data sources 240 (or datasets 120) (which may be stored on the computing device 200 or stored remotely, such as on a data visualization server 300), selects data fields from the data sources, and uses the selected fields to define a visual graphic. In some implementations, the data visualization application includes a natural language processing system 150 (e.g., Snowy). In accordance with the user selection of one or more data sources, the natural language processing system 150 generates utterance recommendations, which, when selected by the user, causes the data visualization application 230 to retrieve data values from the data sources 240, and use the selected fields to define a visual graphic; and zero or more databases or data sources 240 (e.g., a first data source 240-1 and a second data source 240-2), which are used by the data visualization application 230. In some implementations, the data sources are stored as spreadsheet files, CSV files, text files, JSON files, XML files, or flat files, or stored in a relational database.

In some implementations, the data visualization application 230 includes a data visualization generation module 234, which takes user input (e.g., a visual specification 236, or user selection of an utterance recommendation that is generated by a natural language processing system 150) and generates a corresponding visual graphic. The data visualization application 230 then displays the generated visual graphic in the graphical user interface 100. In some implementations, the data visualization application 230 executes as a standalone application (e.g., a desktop application). In some implementations, the data visualization application 230 executes within the web browser 226 or another application using web pages provided by a web server (e.g., a server-based application).

In some implementations, the information the user provides (e.g., user input) is stored as a visual specification 236. The visual specification specifies the data source (e.g., the user selected data source), a plurality of visual variables, and a plurality of data fields from the data source. Each of the data fields is identified as either a dimension or a measure. Each of the visual variables is associated with a respective one or more of the data fields. Each of the visual variables defines a respective characteristic of data marks in the data visualization according to association of a respective one or more of the data fields with the respective visual variable, the respective characteristic specifying horizontal position, vertical position, color (e.g., color encoding), size, or text (e.g., x-encoding and/or y-encoding), for the data marks. In some implementations, the visual specification 236 includes previous natural language commands received from a user or properties specified by the user through natural language commands.

In some implementations, the data visualization application 230 includes a language processing system 150 (e.g., Snowy) for generating and presenting natural language utterances as recommendations (e.g., utterance recommendations) during visual data analysis, as described with reference to FIGS. 1, 2, 5-11, and 12A-12U. In some implementations, the natural language processing system 150 includes an interface manager 152, a natural language parser 154, and a recommendation engine 156, as described in FIGS. 2 and 5-11. In some implementations, the language processing system 150 processes (e.g., interprets) commands provided by a user of the computing device. In some implementations, the commands are natural language commands (e.g., queries, utterances, or inputs) (e.g., captured by the audio input device 220). In some implementations, the language processing module 150 includes sub-modules such as an autocomplete module, a pragmatics module, and an ambiguity module, each of which is discussed in further detail below. In some implementations, the memory 206 stores metrics and/or scores determined by the language processing system 150. In addition, the memory 206 may store thresholds and other criteria, which are compared against the metrics and/or scores (e.g., interaction scores and/or intent scores) determined by the language processing system 150.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above.

Although FIG. 3 shows a computing device 200, FIG. 3 is intended more as a functional description of the various features that may be present rather than as a structural schematic of the implementations described herein. In practice, and as recognized by those of ordinary skill in the art, items shown separately could be combined and some items could be separated.

Figure 4:
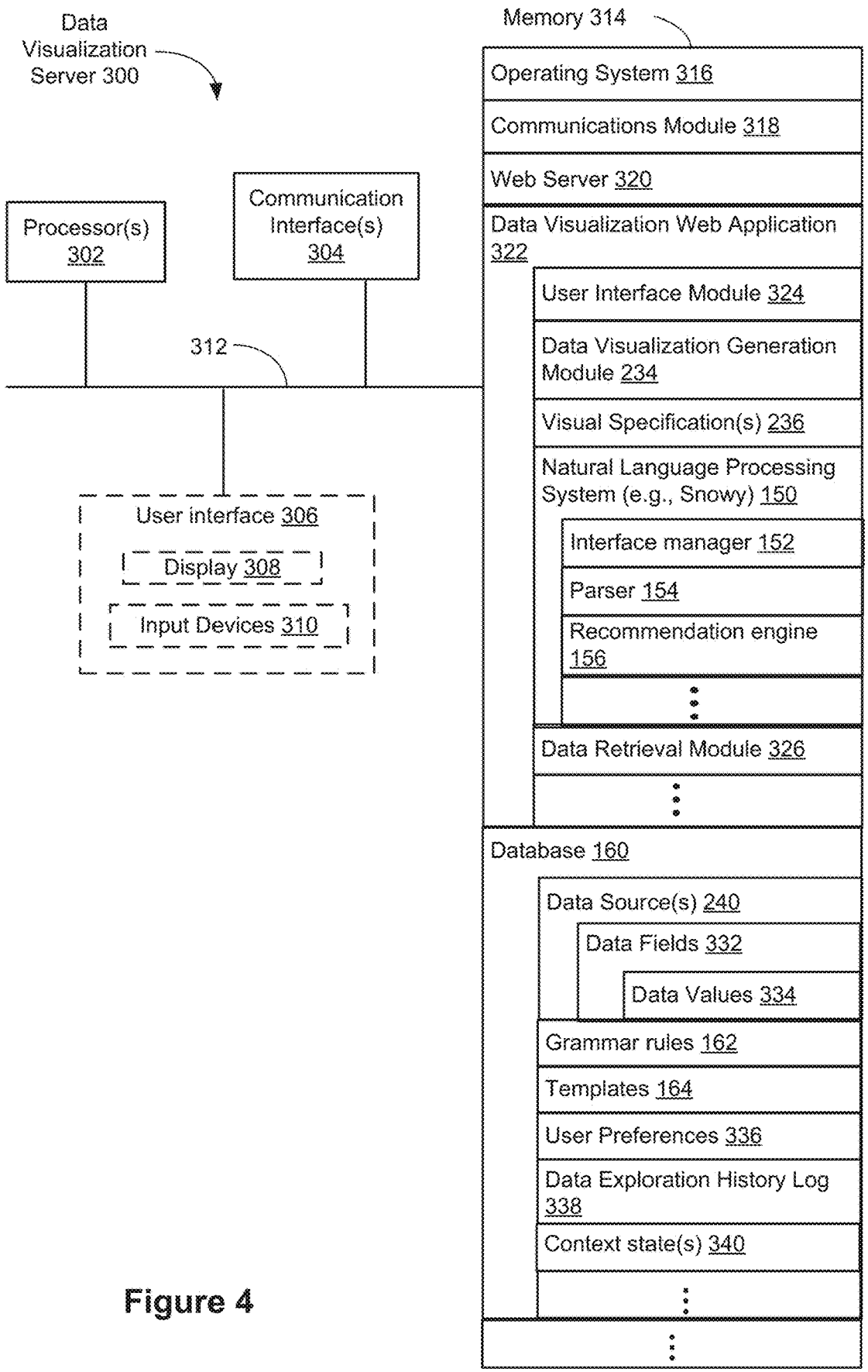
FIG. 4 is a block diagram of a server system according to some implementations.

FIG. 4 is a block diagram of a data visualization server 300 in accordance with some implementations. A data visualization server 300 may host one or more databases 160 or may provide various executable applications or modules. A server 300 typically includes one or more processing units/cores (CPUs) 302, one or more network interfaces 304, memory 314, and one or more communication buses 312 for interconnecting these components. In some implementations, the server 300 includes a user interface 306, which includes a display 308 and one or more input devices 310, such as a keyboard and a mouse. In some implementations, the communication buses 312 include circuitry (sometimes called a chipset) that interconnects and controls communications between system components.

In some implementations, the memory 314 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. In some implementations, the memory 314 includes one or more storage devices remotely located from the CPU(s) 302. The memory 314, or alternatively the non-volatile memory devices within the memory 314, comprises a non-transitory computer readable storage medium.

In some implementations, the memory 314, or the computer readable storage medium of the memory 314, stores the following programs, modules, and data structures, or a subset thereof:

- an operating system 316, which includes procedures for handling various basic system services and for performing hardware dependent tasks;
- a network communication module 318, which is used for connecting the server 300 to other computers via the one or more communication network interfaces 304 (wired or wireless) and one or more communication networks, such as the Internet, other wide area networks, local area networks, metropolitan area networks, and so on;
- a web server 320 (such as an HTTP server), which receives web requests from users and responds by providing responsive web pages or other resources;
- a data visualization web application 322, which may be downloaded and executed by a web browser 226 on a user's computing device 200. In general, a data visualization web application 322 has the same functionality as a desktop data visualization application 230, but provides the flexibility of access from any device at any location with network connectivity, and does not require installation and maintenance. In some implementations, the data visualization web application 322 includes various software modules to perform certain tasks. In some implementations, the web application 322 includes a user interface module 324, which provides the user interface for all aspects of the web application 322. The user interface module 324 may include an attribute panel 102, a filters panel 104, an encodings panel 106, a natural language input command box 110, a visualization canvas 112, and/or a recommendations panel 114, as described above with respect to FIG. 1. In some implementations, the web application includes a data visualization generation module 234, as described above in FIG. 3. In some implementations, the web application 322 includes a data retrieval module 326, which builds and executes queries to retrieve data from one or more data sources 240. The data sources 240 may be stored locally on the server 300 or stored in an external database 160. In some implementations, data from two or more data sources may be blended. In some implementations, the data retrieval module 326 uses a visual specification 236 to build the queries, as described above with respect to FIG. 3;
- one or more databases 160, which store data used or created by the data visualization web application 322 or data visualization application 230. The databases 160 may store data sources 240, which provide the data used in the generated data visualizations. Each data source 240 includes one or more data fields 332, each having one or more respective data values 334. The database 160 may store grammar rules 162 specified for the various analytical intents and follow-up utterances, as described with respect to FIGS. 2 and 6. The database 160 may store templates 164 for generating natural language utterance recommendations, as described with respect to FIGS. 2, 10, and 11.

In some implementations, the data visualization web application 322 includes a language processing system 150 (e.g., Snowy) for generating and presenting natural language utterances as recommendations (e.g., utterance recommendations) during visual data analysis, as described with reference to FIGS. 1, 2, 3, 5-11, and 12A-12U. The Natural Language System 150 includes an Interface Manager 152, a Parser 154, and a Recommendation Engine 156, as described above.

In some implementations, the database 160 stores a data exploration history log 338 for each user, which contains the user's interaction history with data sources 240. In some implementations, the database 160 stores one or more context states 340 as the user interacts with the data visualization application 230 or the data visualization web application 322. As described with respect to FIG. 2, the context state 340 is modeled as a combination of the active chart and mark selections, the active utterance, and/or a user's data exploration history, and is used to drive the utterance recommendations from the natural language processing system 150.

In some implementations, the database 160 stores a set of user preferences 336 for each user. The user preferences may be used when the data visualization web application 322 (or application 230) makes recommendations about how to view a set of data fields 330. In some implementations, the database 160 stores a data visualization history log, which stores information about each data visualization generated. In some implementations, the data visualization history log is stored as part of a user's data exploration history log 338. In some implementations, the database 160 stores other information, including other information used by the data visualization application 230 or data visualization web application 322. The database 160 may be separate from the data visualization server 300, or may be included with the data visualization server (or both).

In some implementations, the database 160 stores the visual specifications 236 selected by users, which may include a user identifier, a timestamp of when the data visualization was created, a list of the data fields used in the data visualization, the type of the data visualization (sometimes referred to as a "view type" or a "chart type"), data encodings (e.g., color and size of marks), the data relationships selected, and what connectors are used. In some implementations, one or more thumbnail images of each data visualization are also stored. Some implementations store additional information about created data visualizations, such as the name and location of the data source, the number of rows from the data source that were included in the data visualization, version of the data visualization software, and so on.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above. In some implementations, the memory 314 stores additional modules or data structures not described above.

Although FIG. 4 shows a data visualization server 300, FIG. 4 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server 300 may be stored or executed on a computing device 200. In some implementations, the functionality and/or data may be allocated between a computing device 200 and one or more servers 300. Furthermore, one of skill in the art recognizes that FIG. 4 need not represent a single physical device. In some implementations, the server functionality is allocated across multiple physical devices that comprise a server system. As used herein, references to a "server" or "data visualization server" include various groups, collections, or arrays of servers that provide the described functionality, and the physical servers need not be physically colocated (e.g., the individual physical devices could be spread throughout the United States or throughout the world).

C. Exemplary Implementations

Figure 12A:
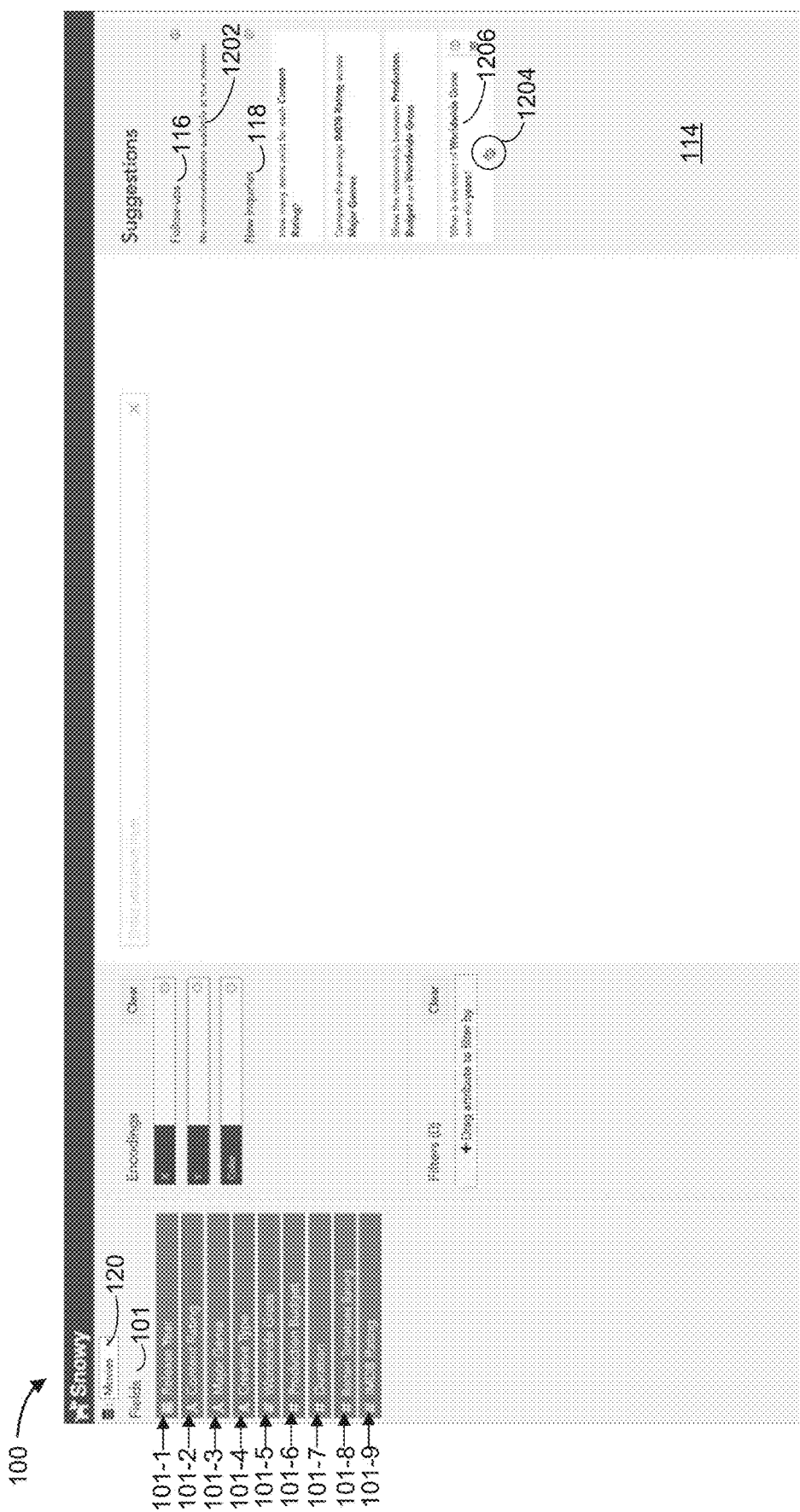
Figure 12B:
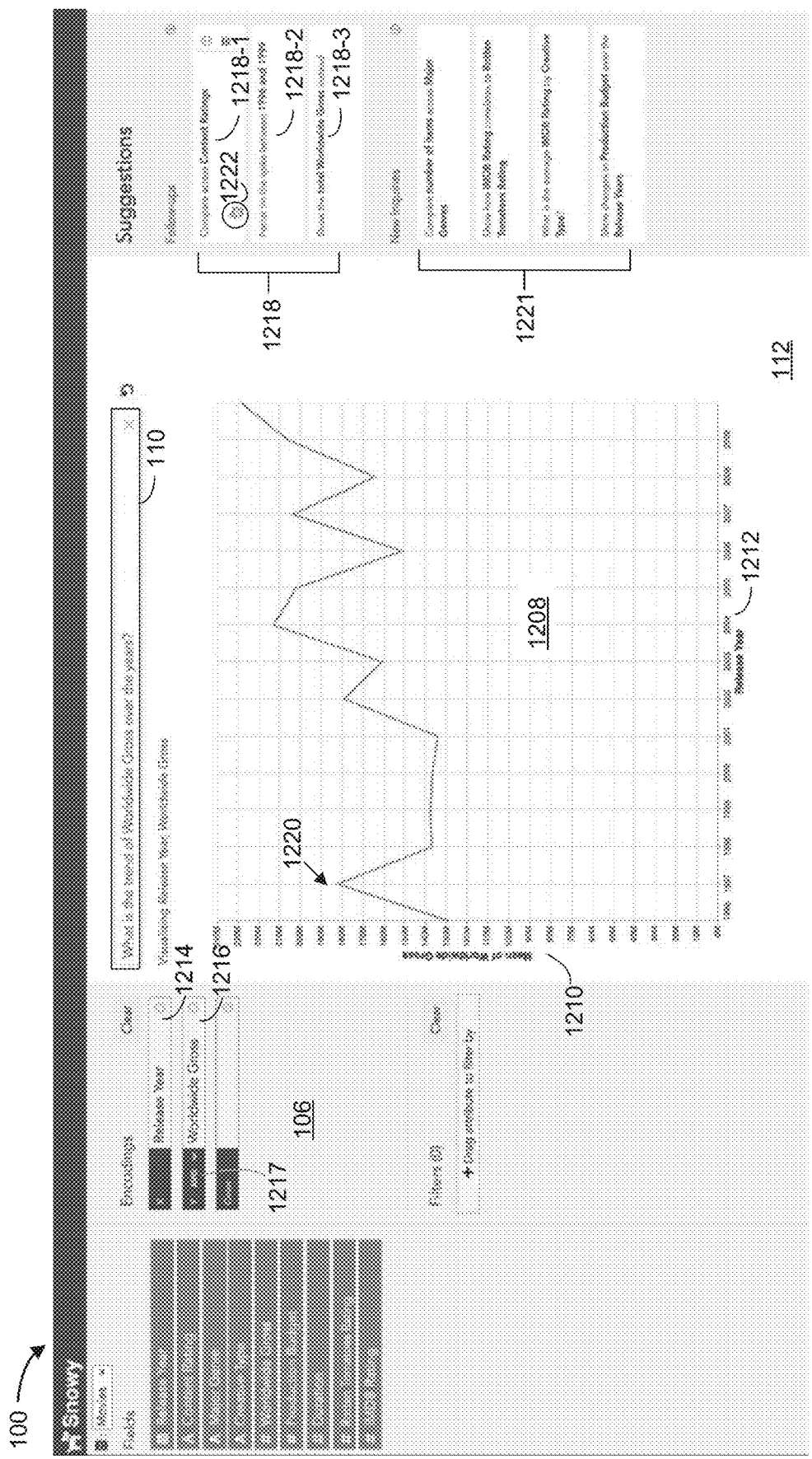
Figure 12C:
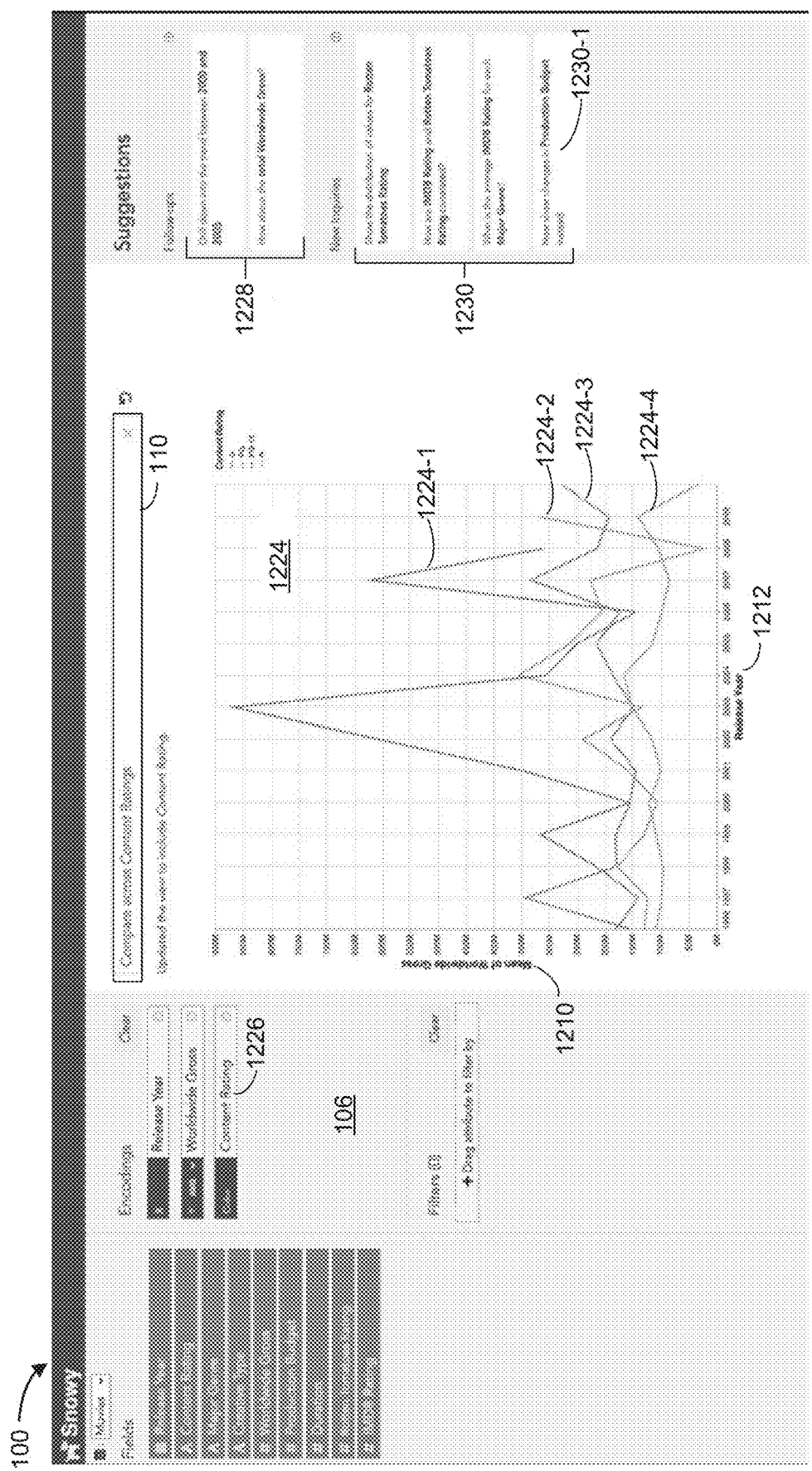
Figure 12D:
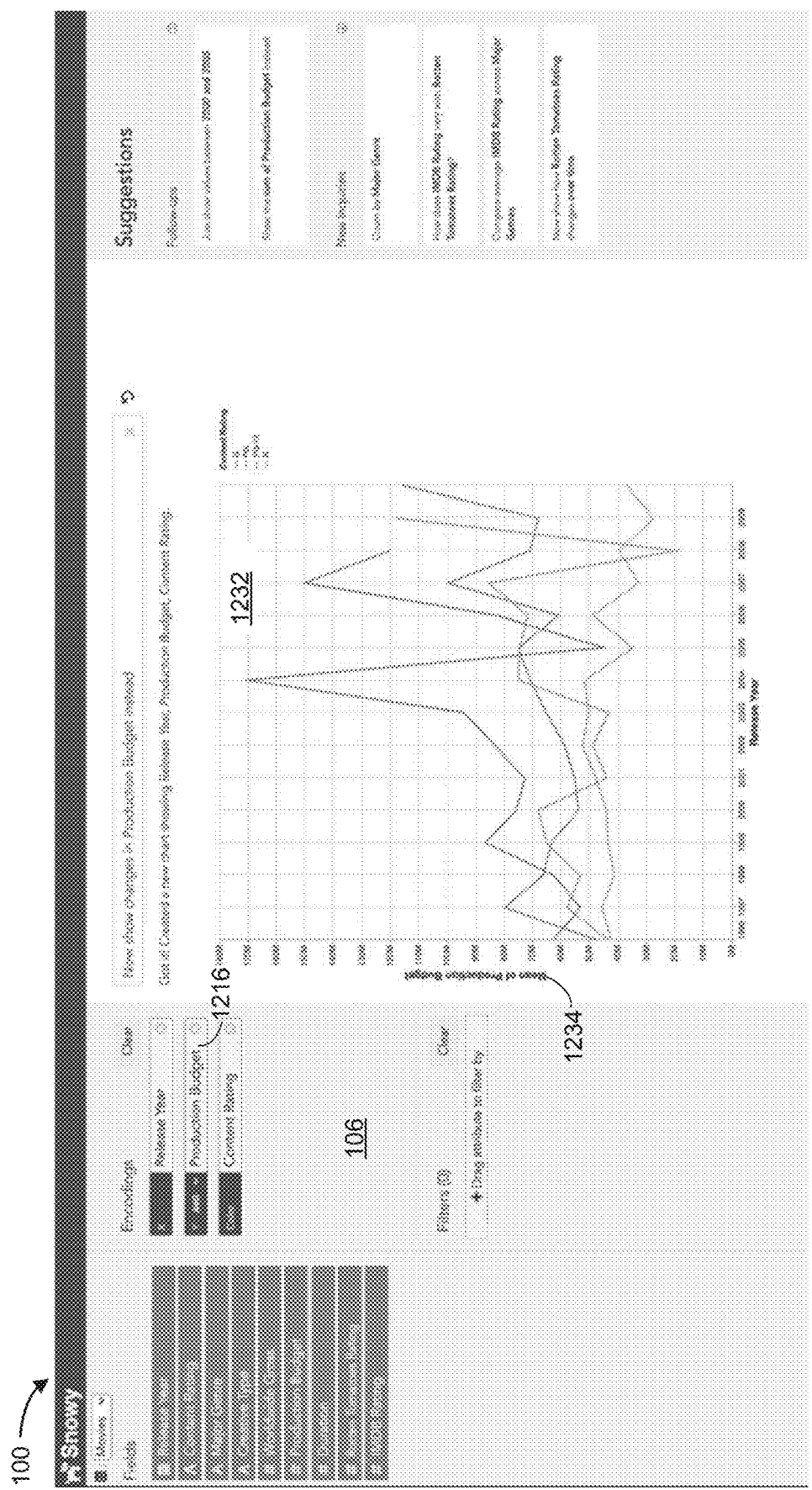
Figure 12E:
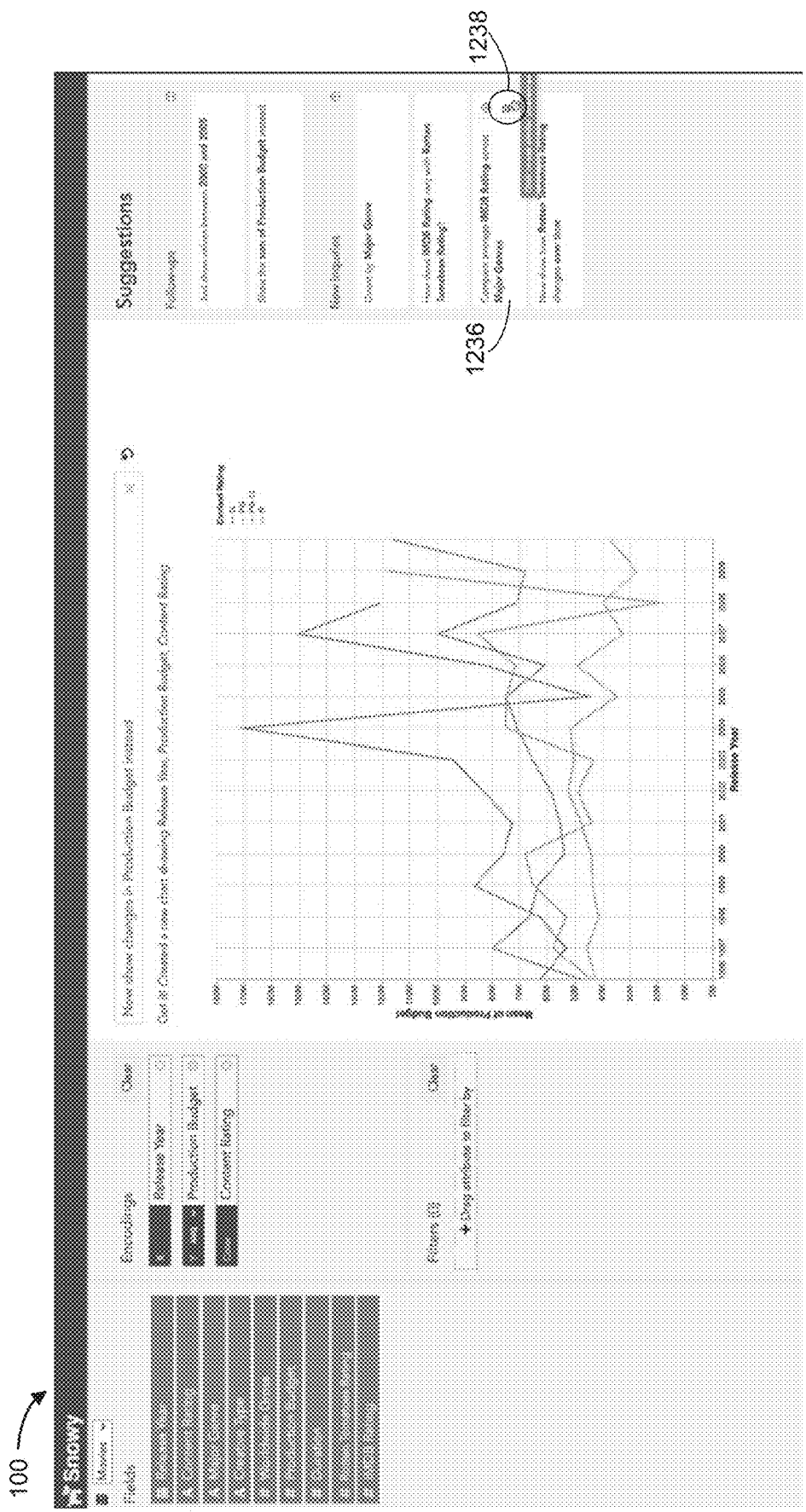
Figure 12F:
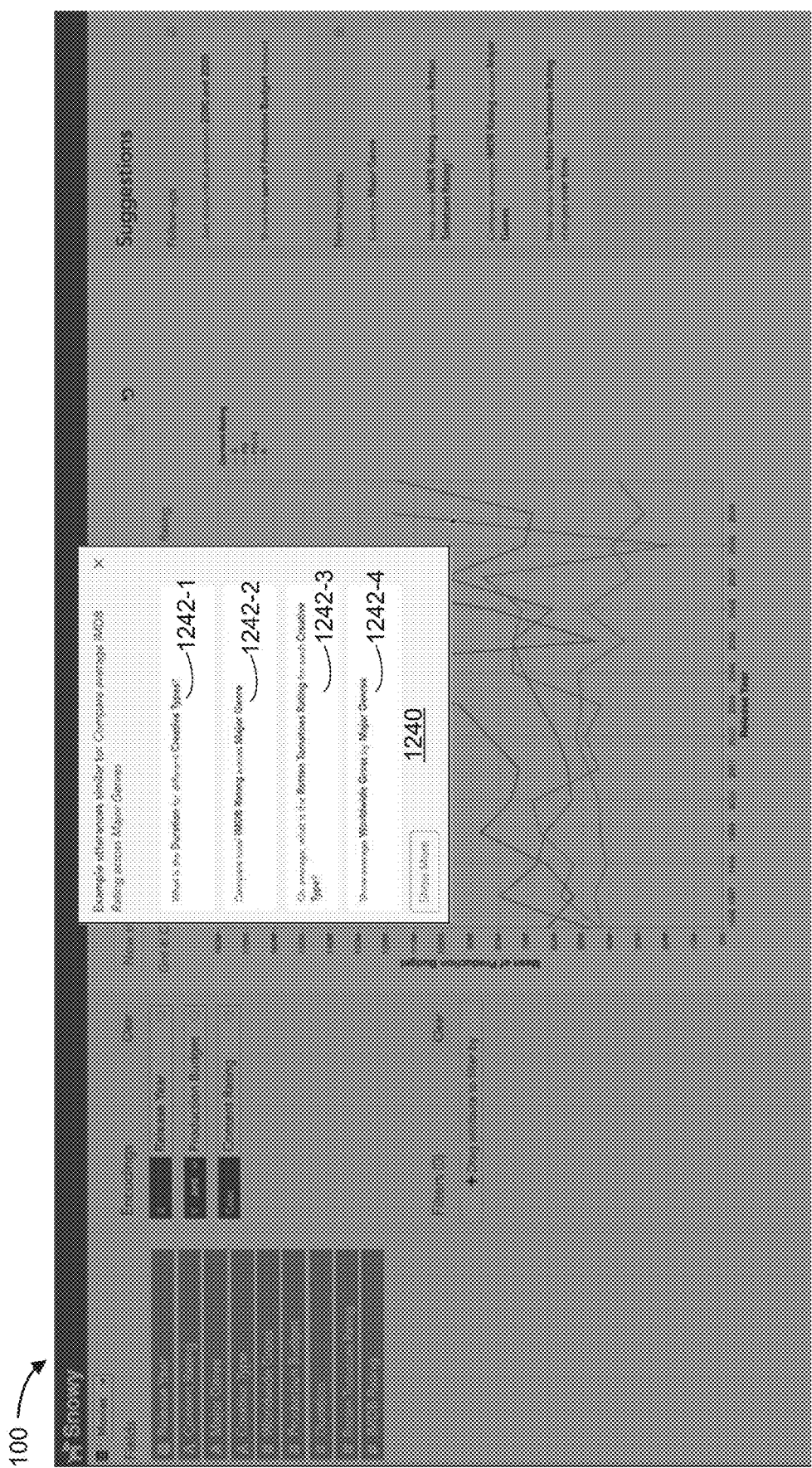
Figure 12G:
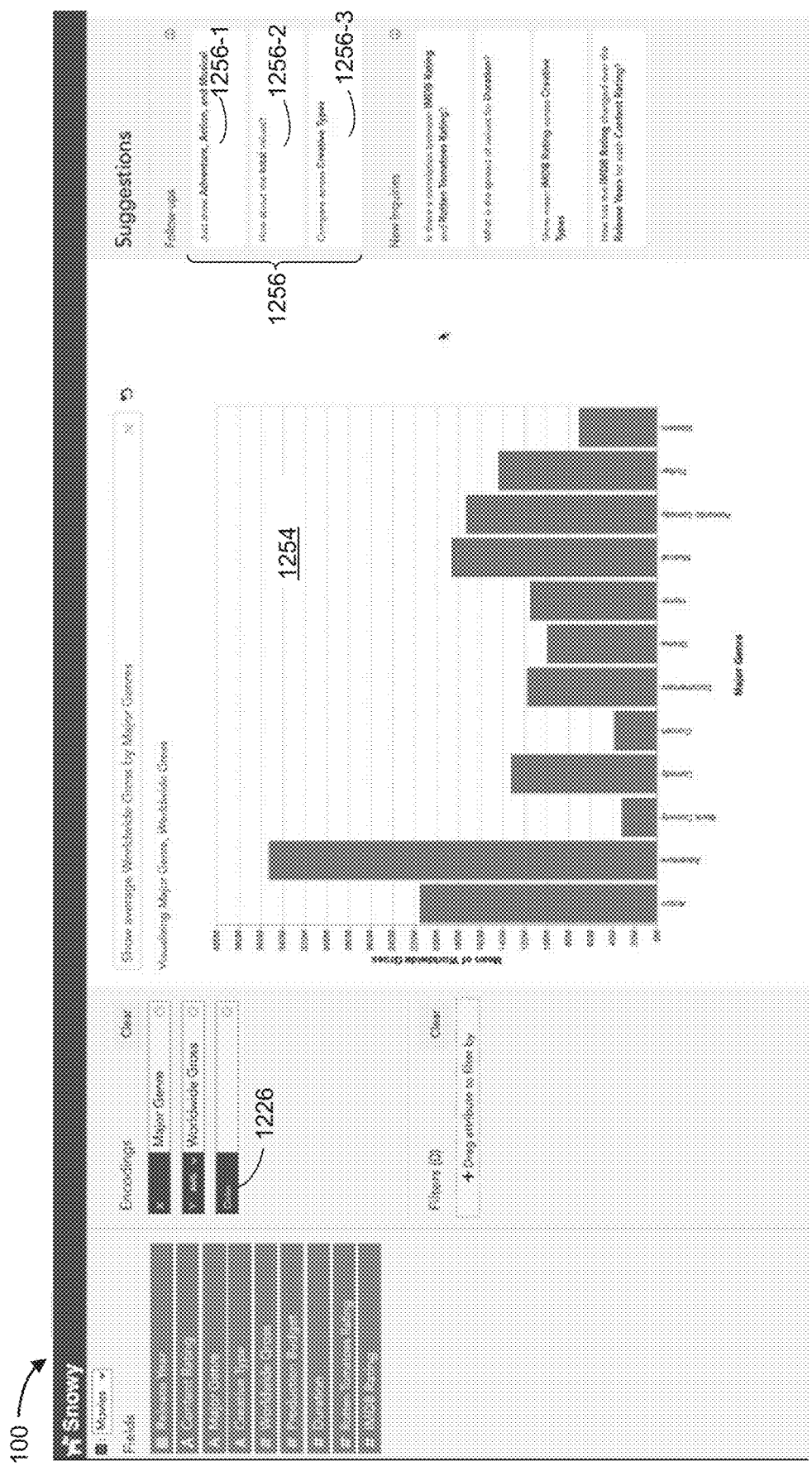
Figure 12H:
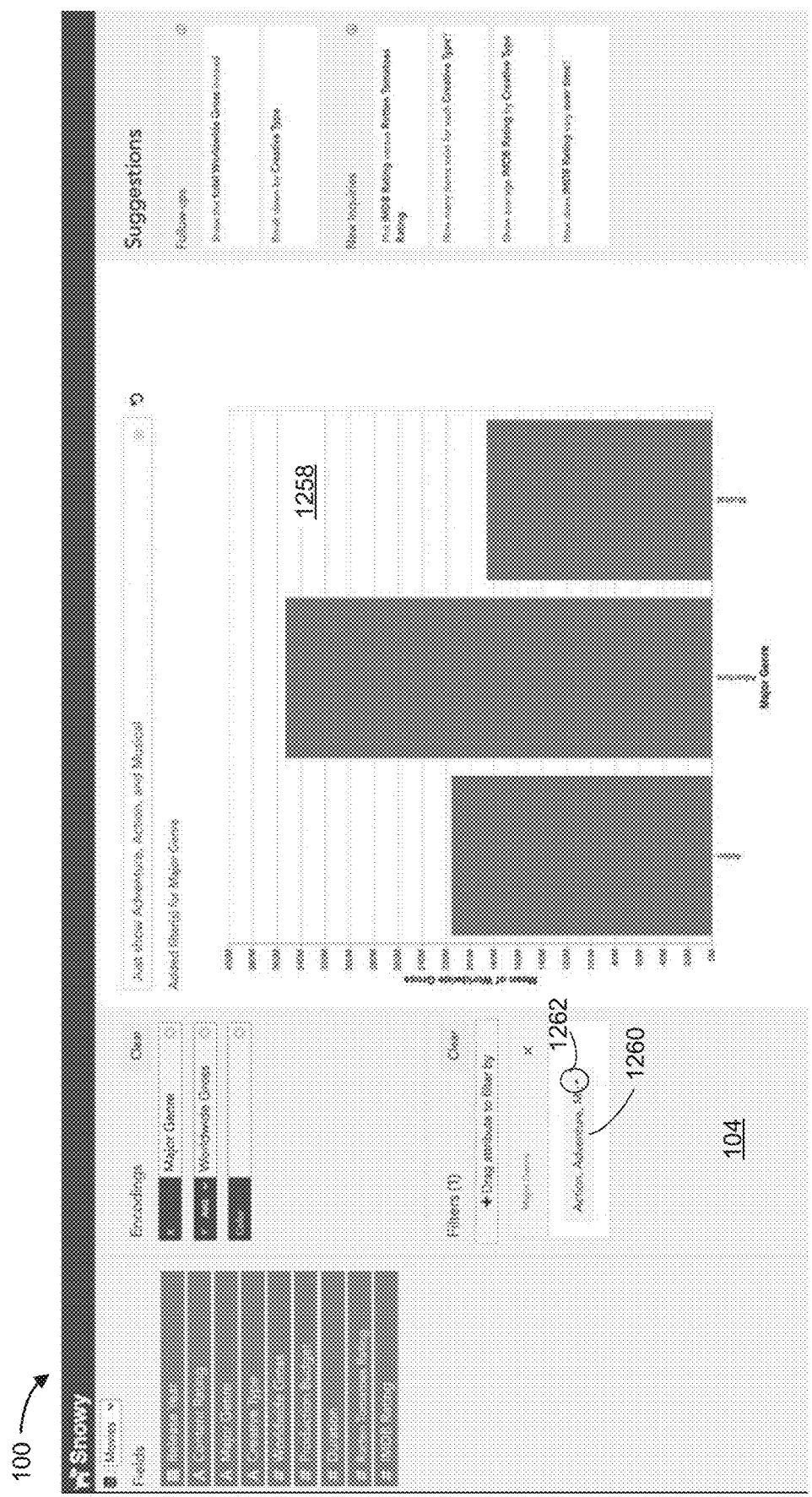
Figure 12I:
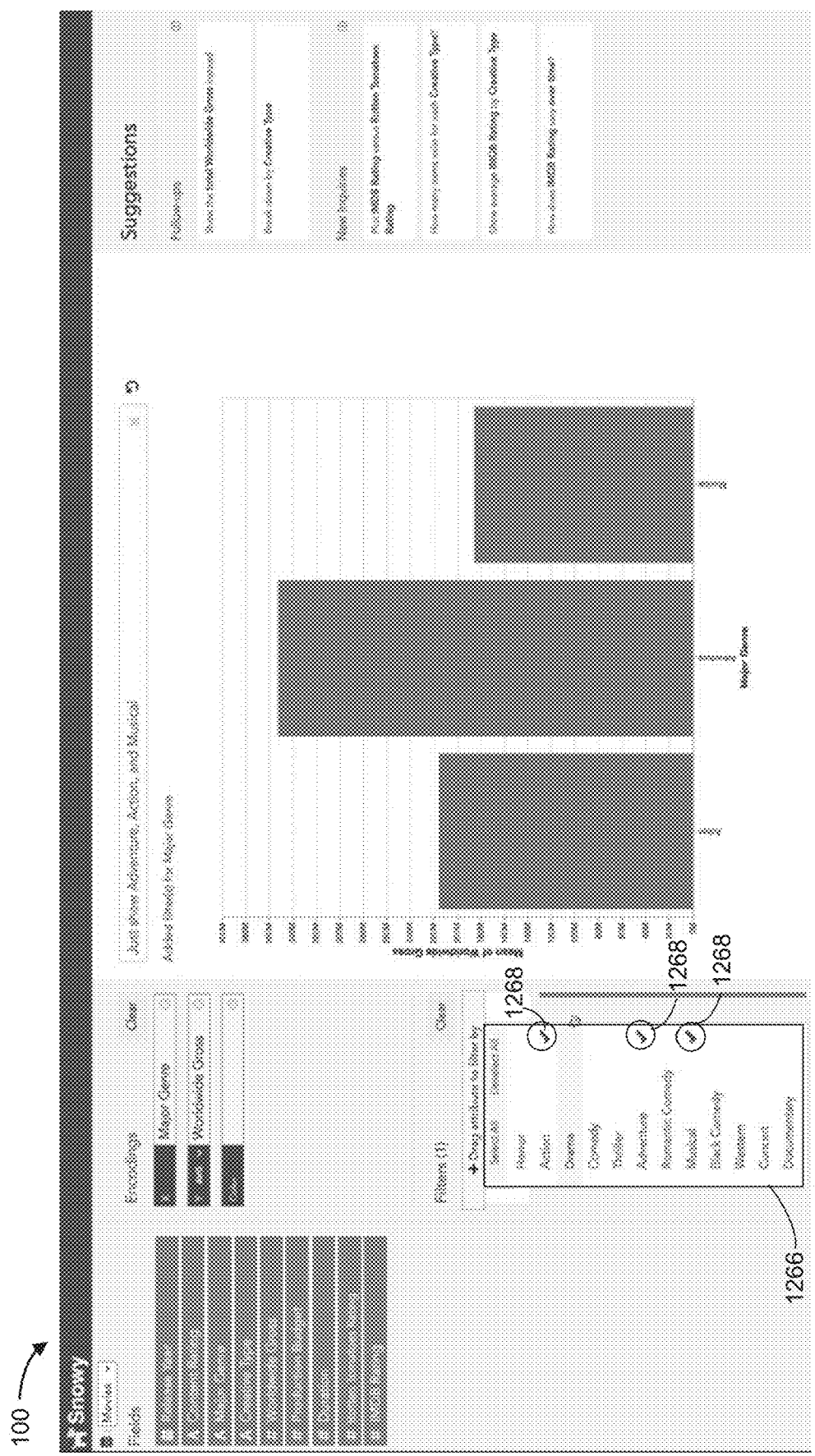
Figure 12J:
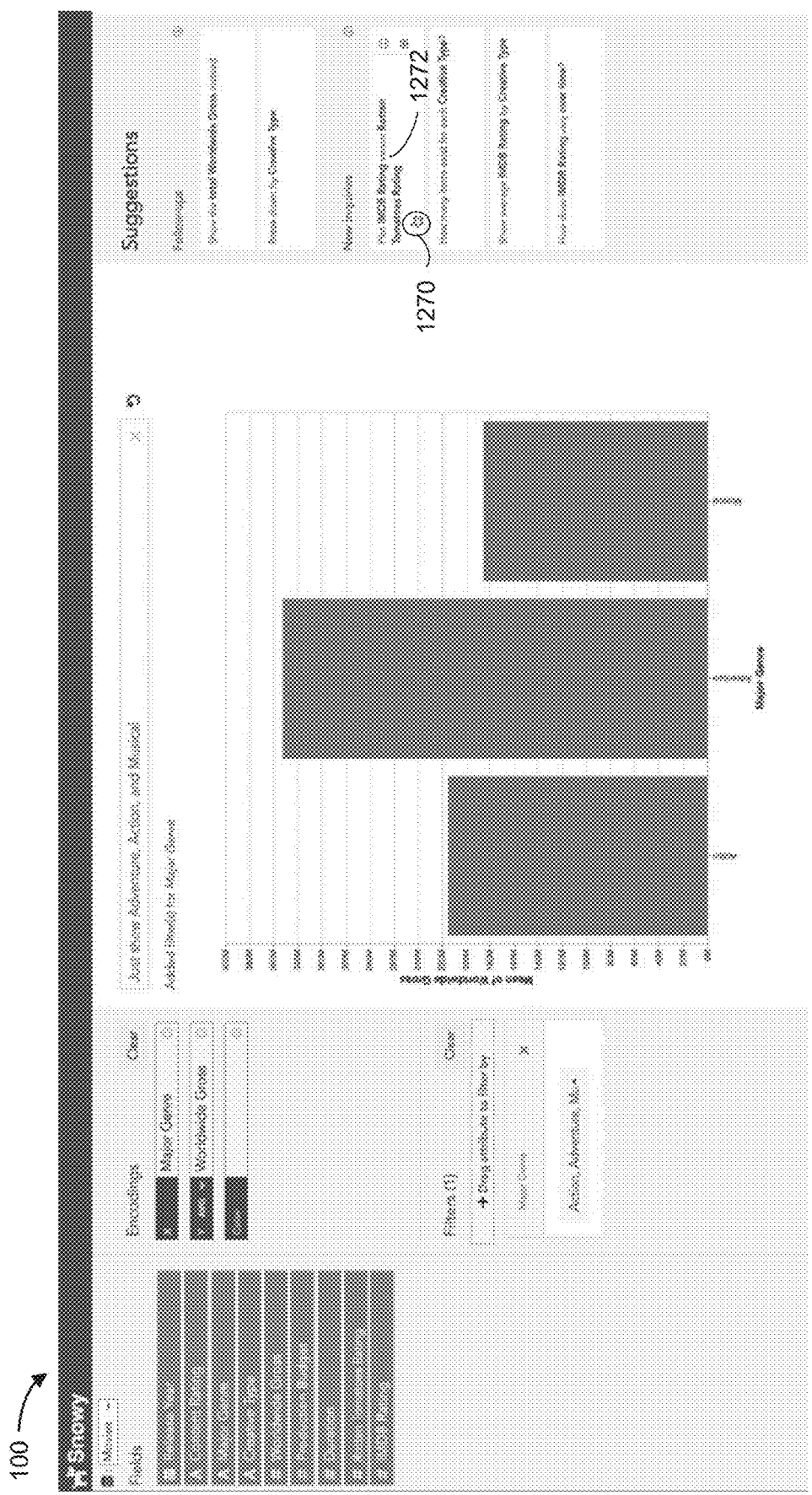
Figure 12K:
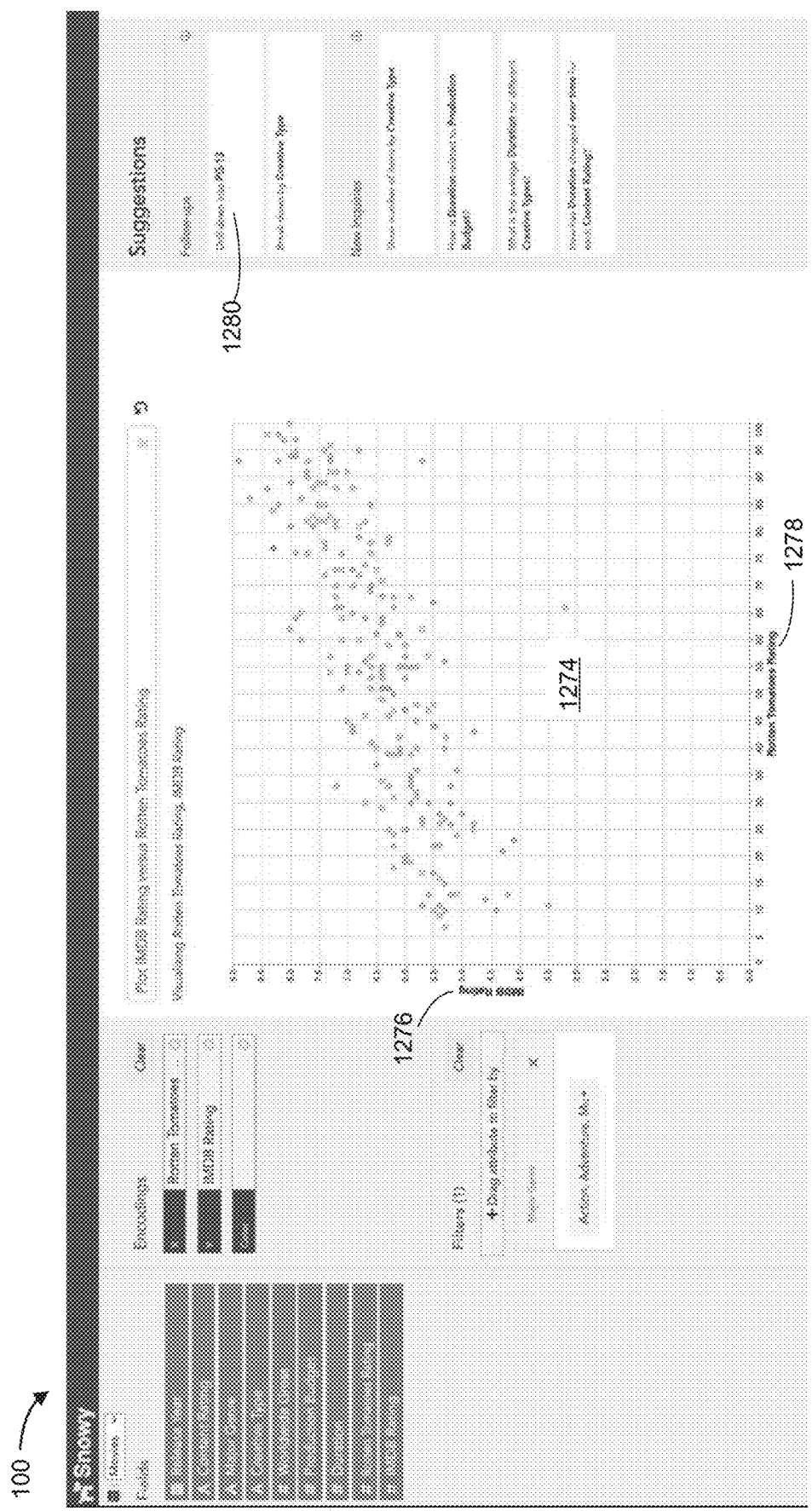
Figure 12L:
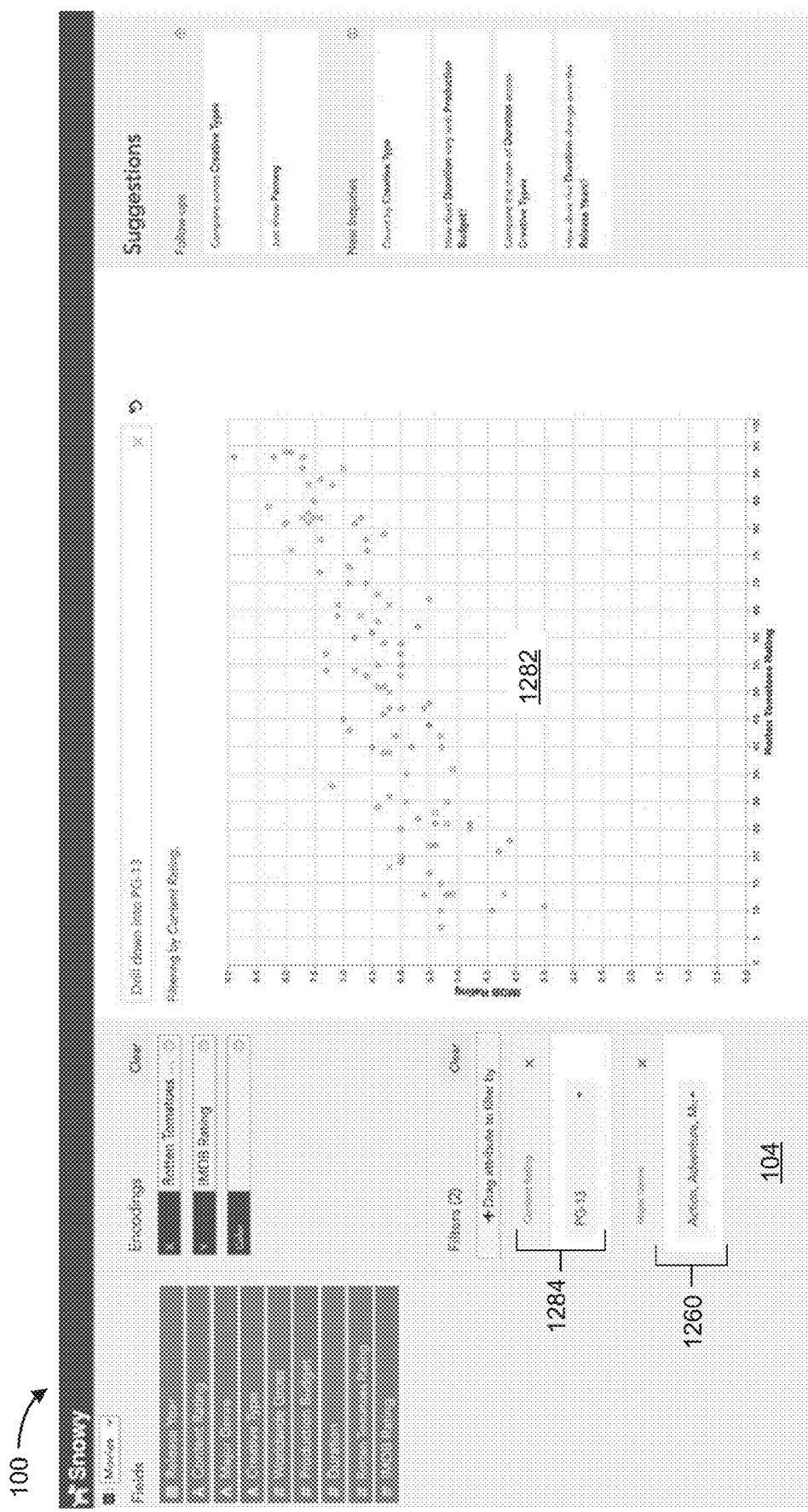
Figure 12M:
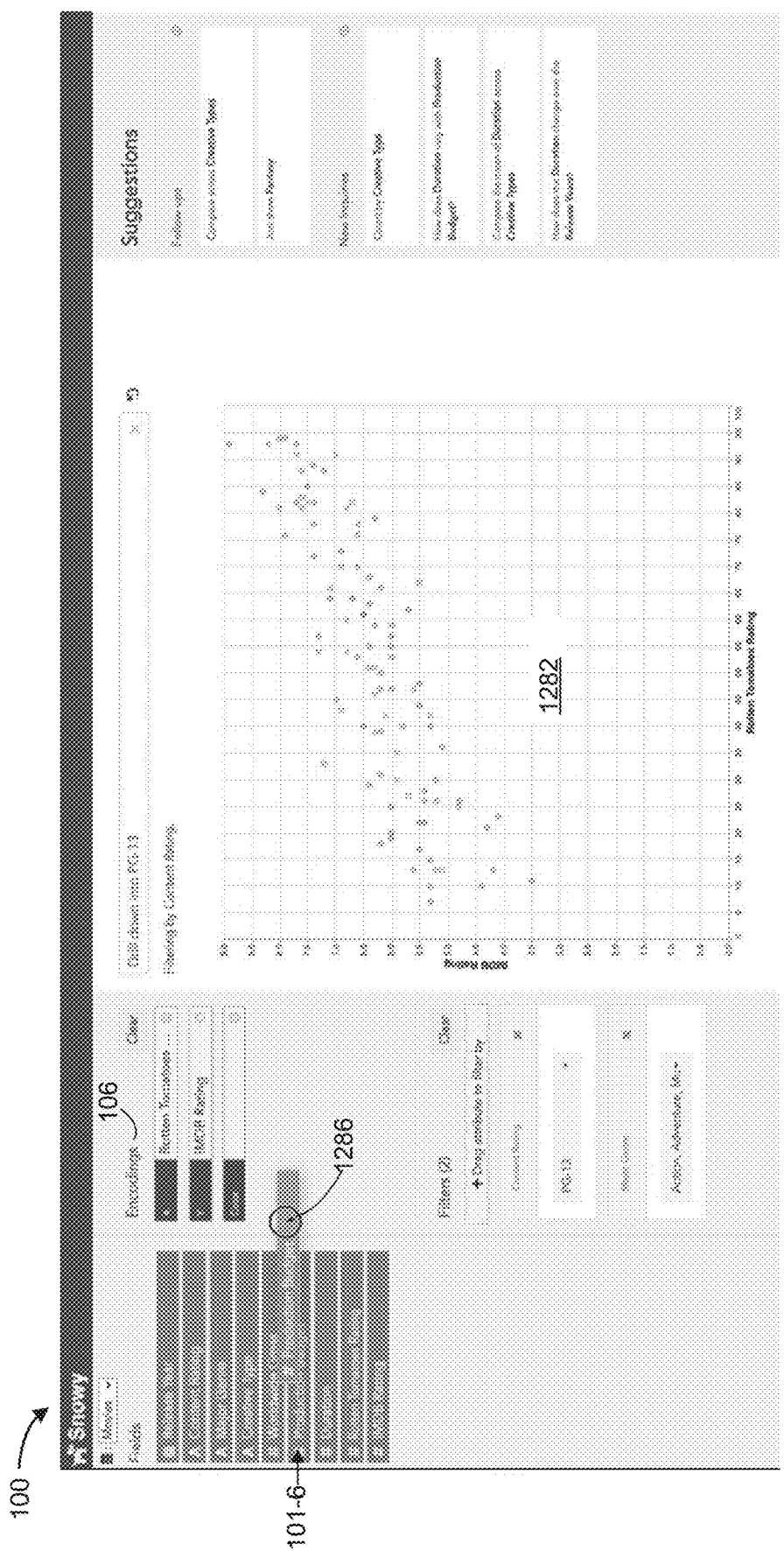
Figure 12N:
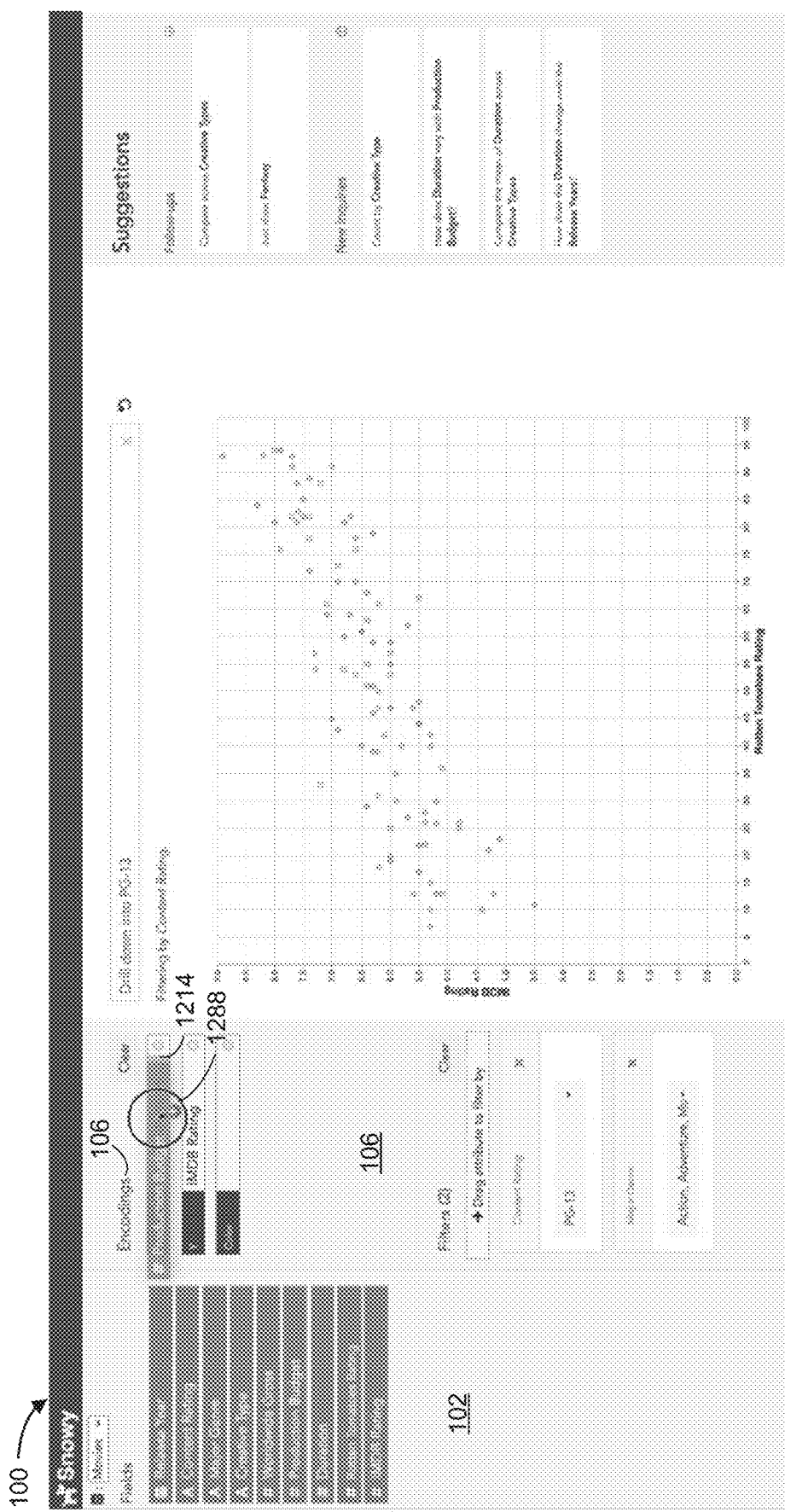
Figure 12O:
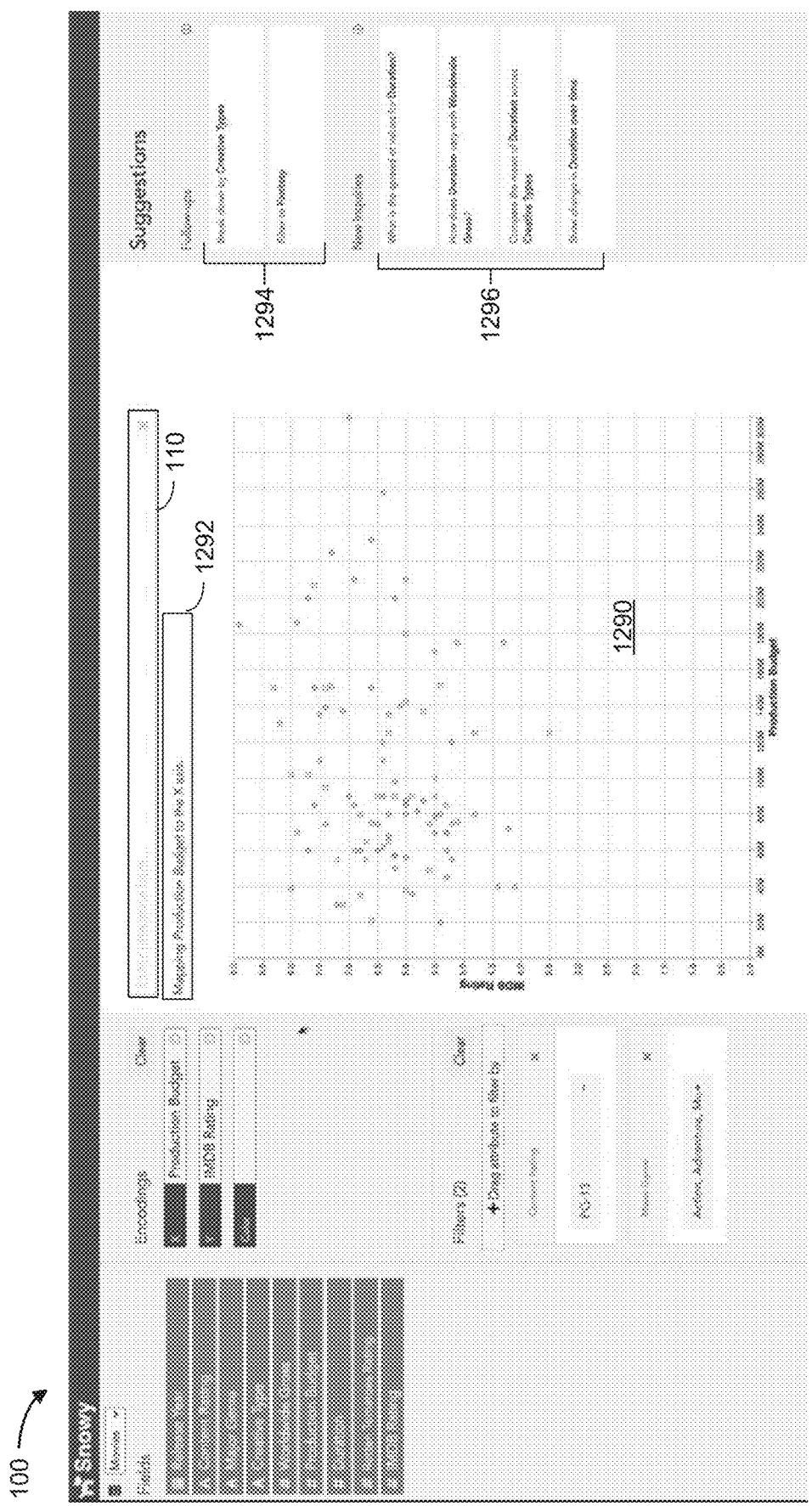
Figure 12P:
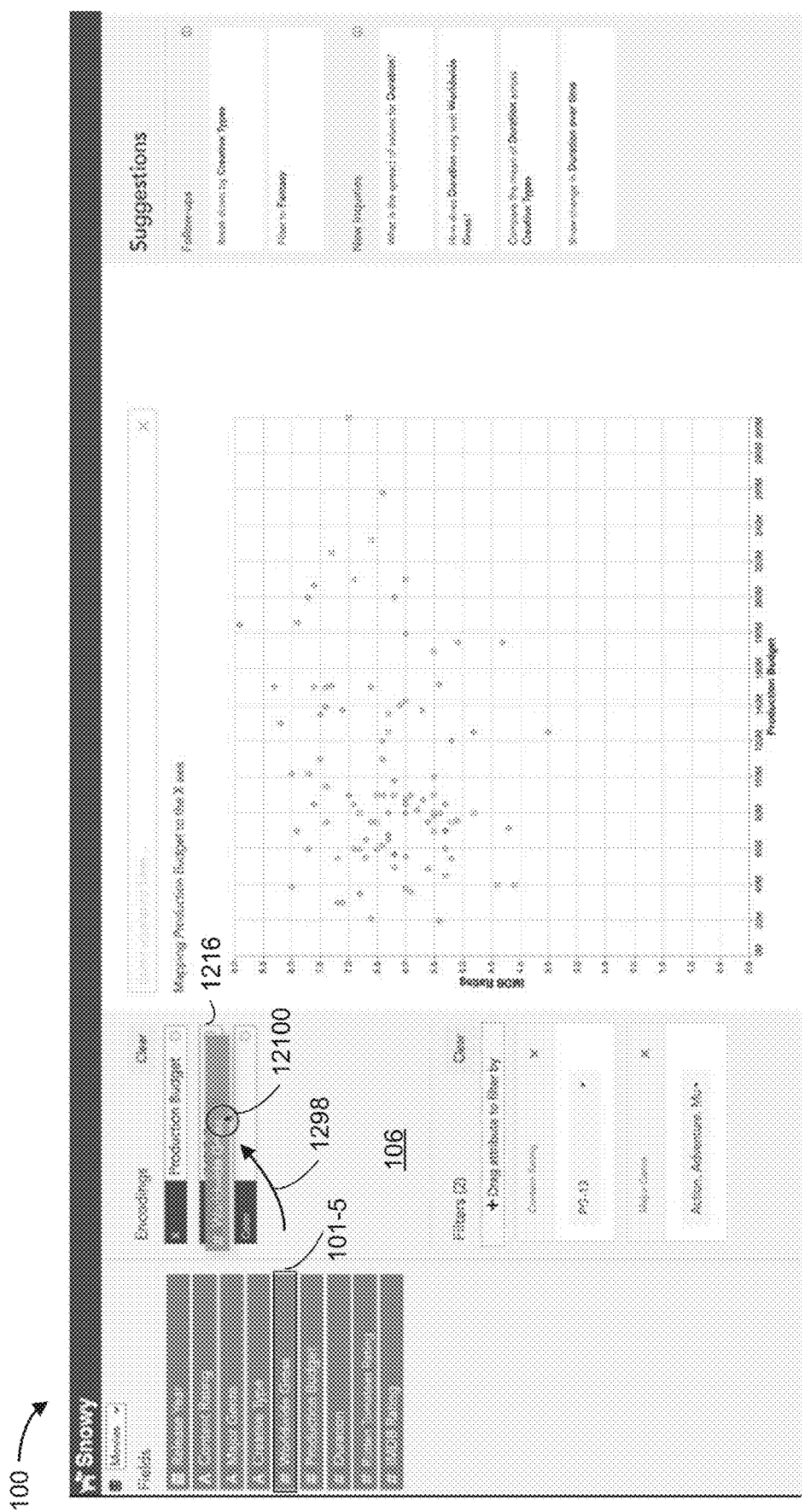
Figure 12Q:
Figure 12R:
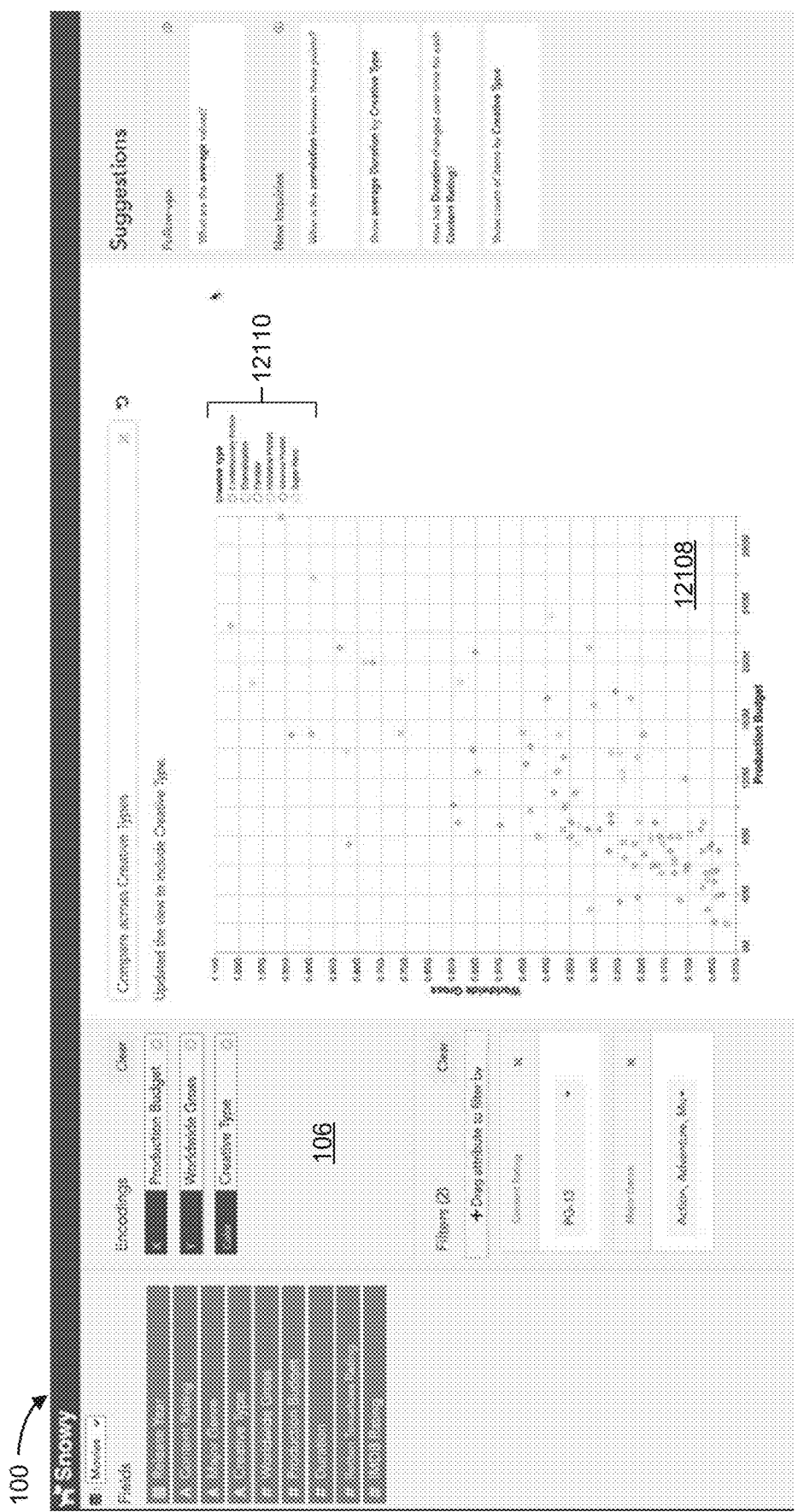
Figure 12S:
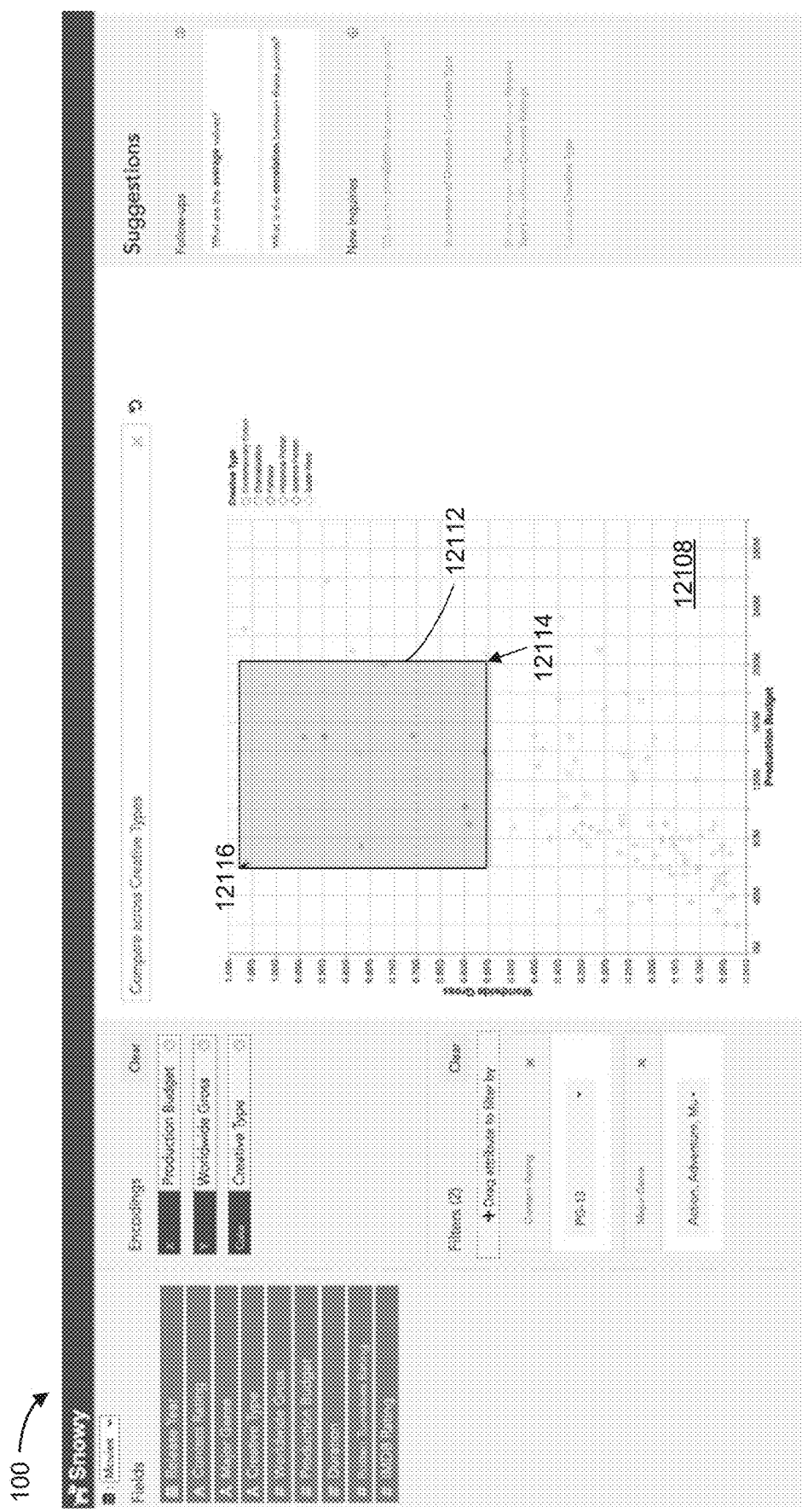
Figure 12T:
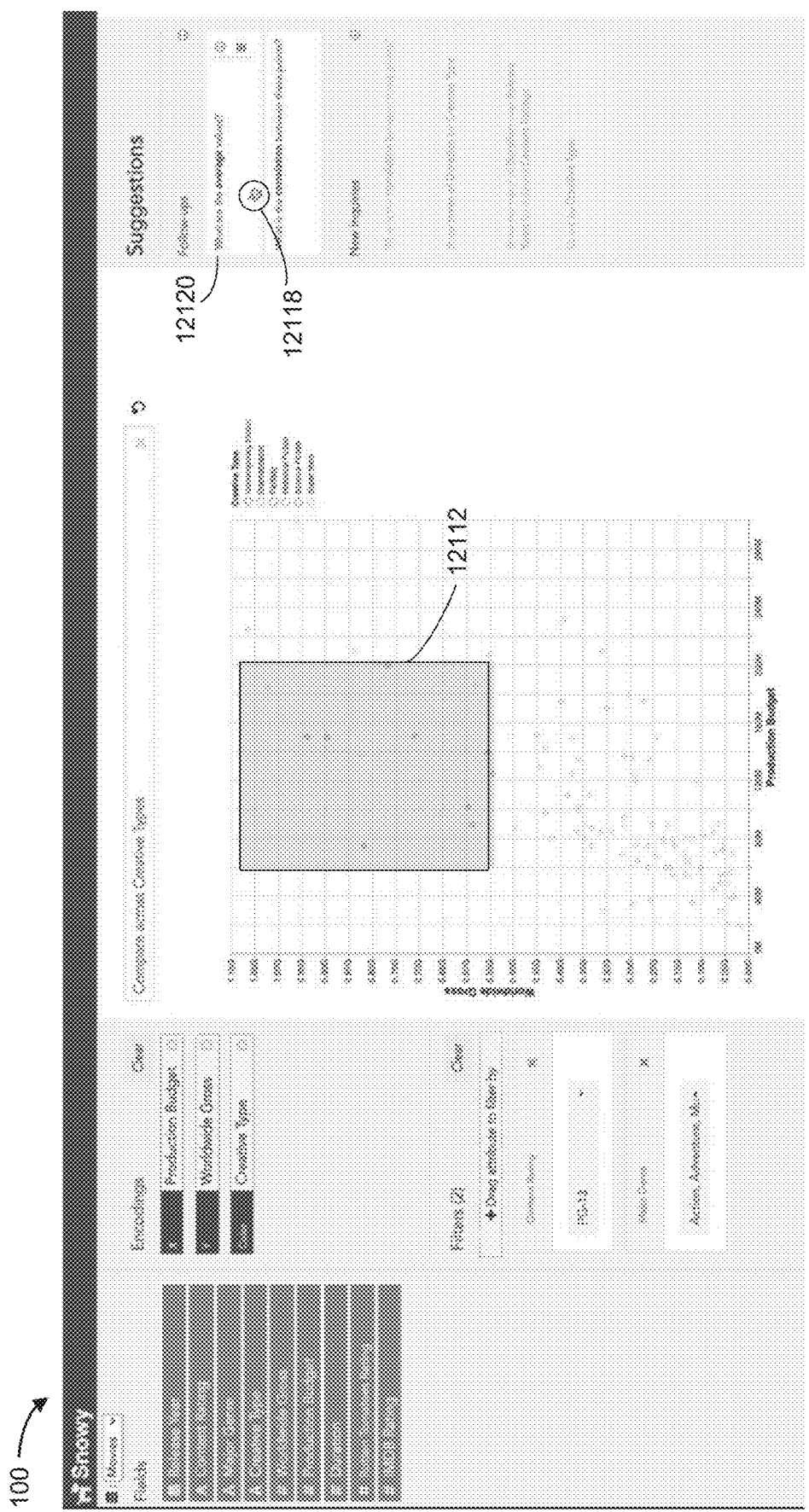
Figure 12U:
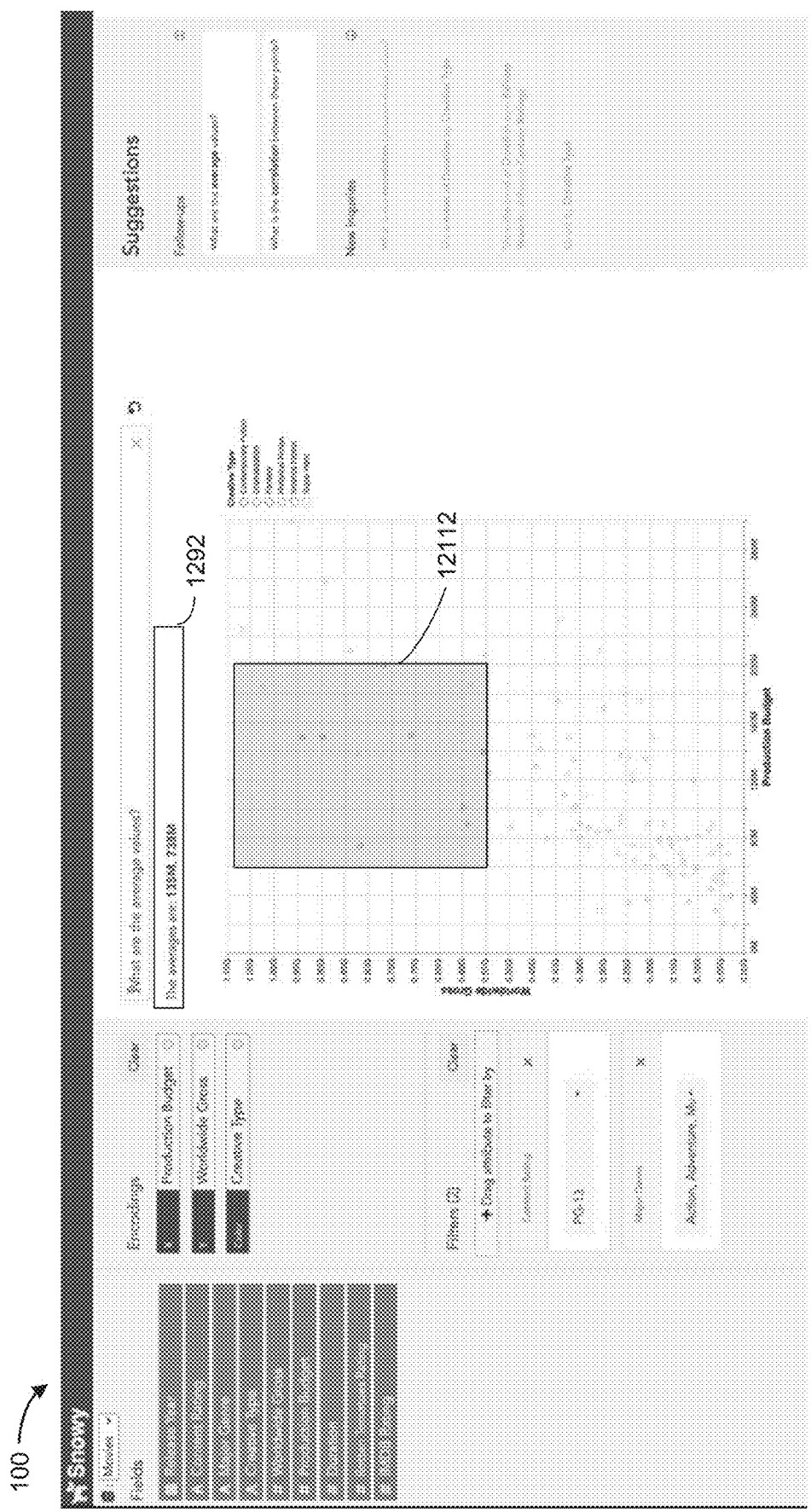
Figure 13A:
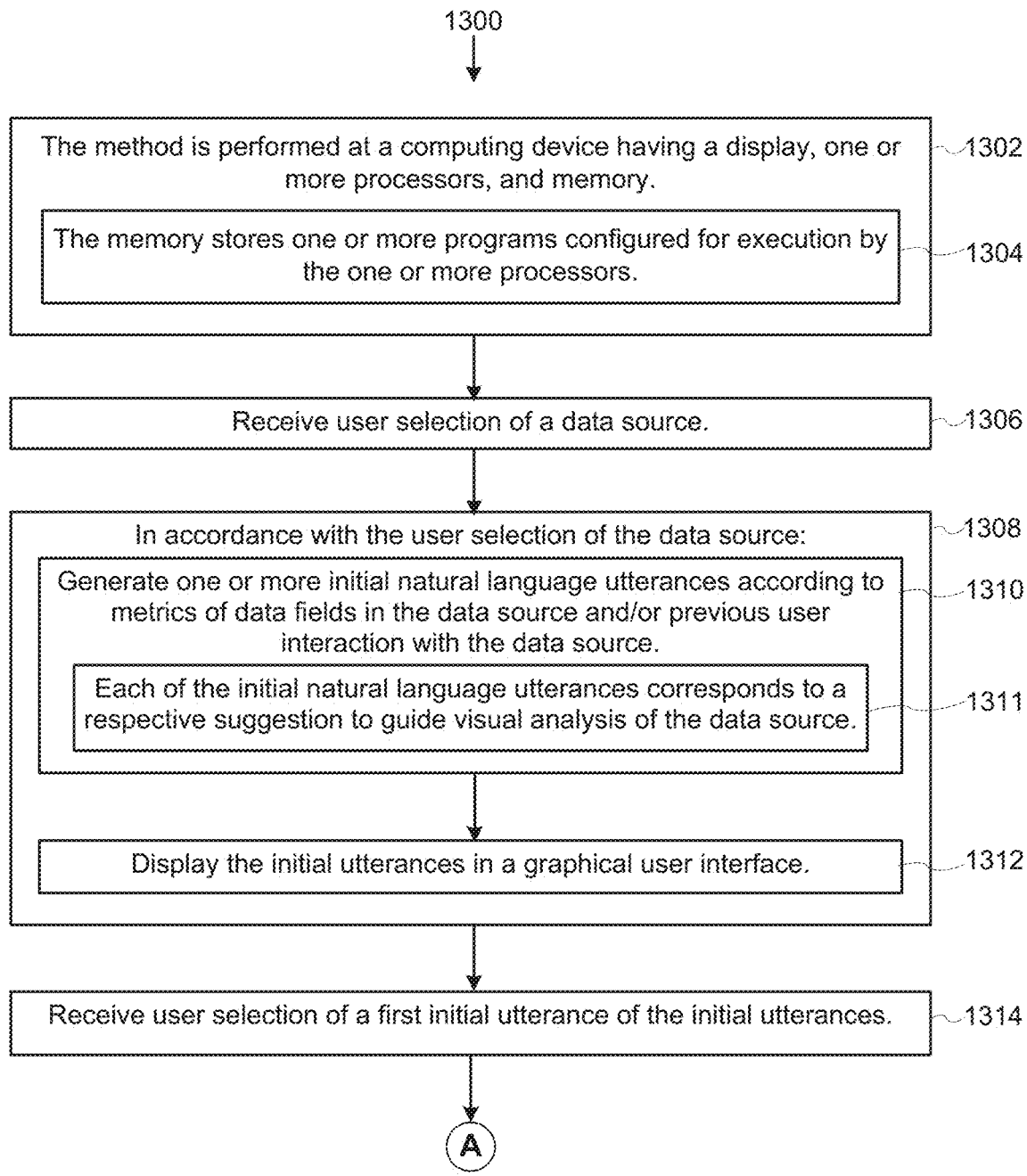
FIGS. 13A-13G provide a flowchart of a method performed at a computing device in accordance with some implementations.
Figure 13B:
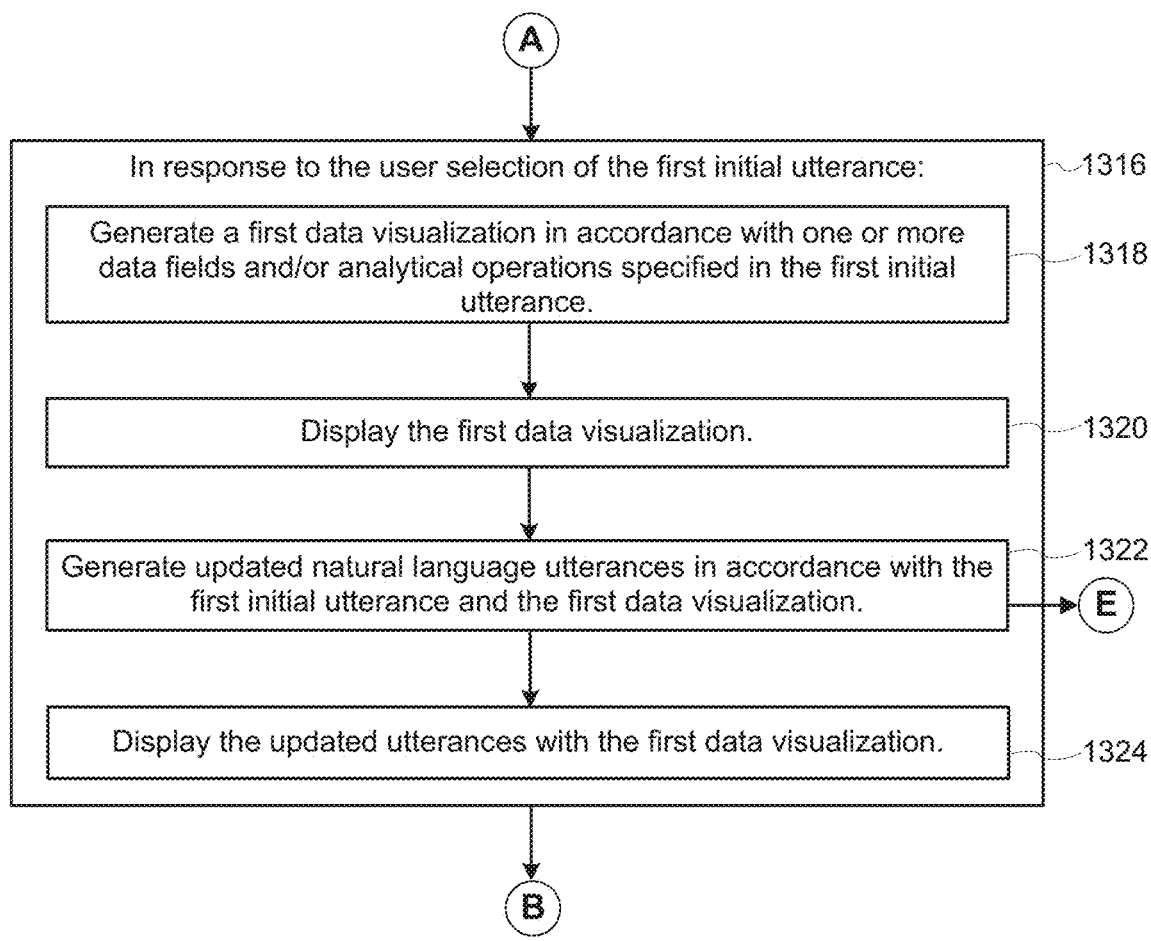
Figure 13C:
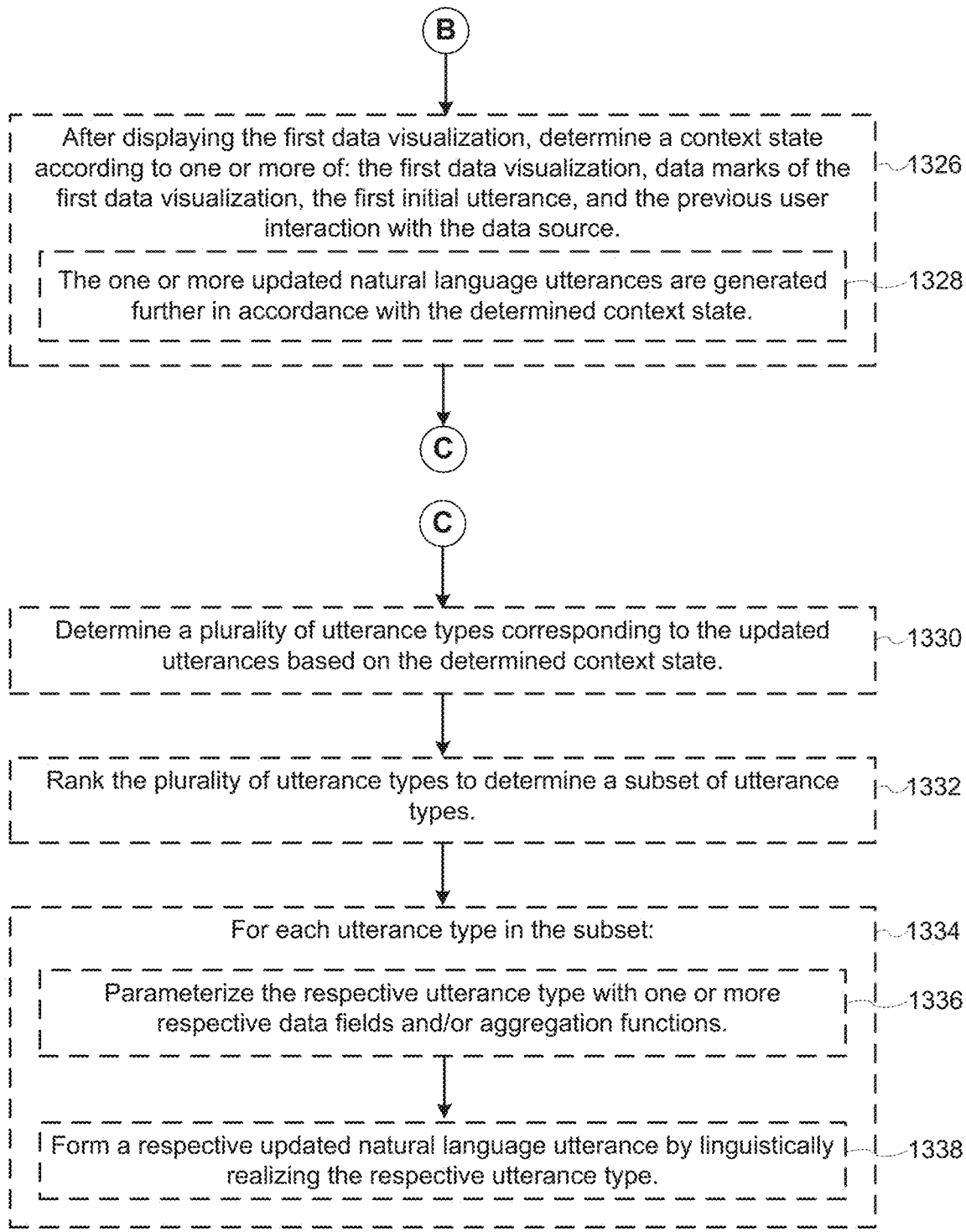
Figure 13D:
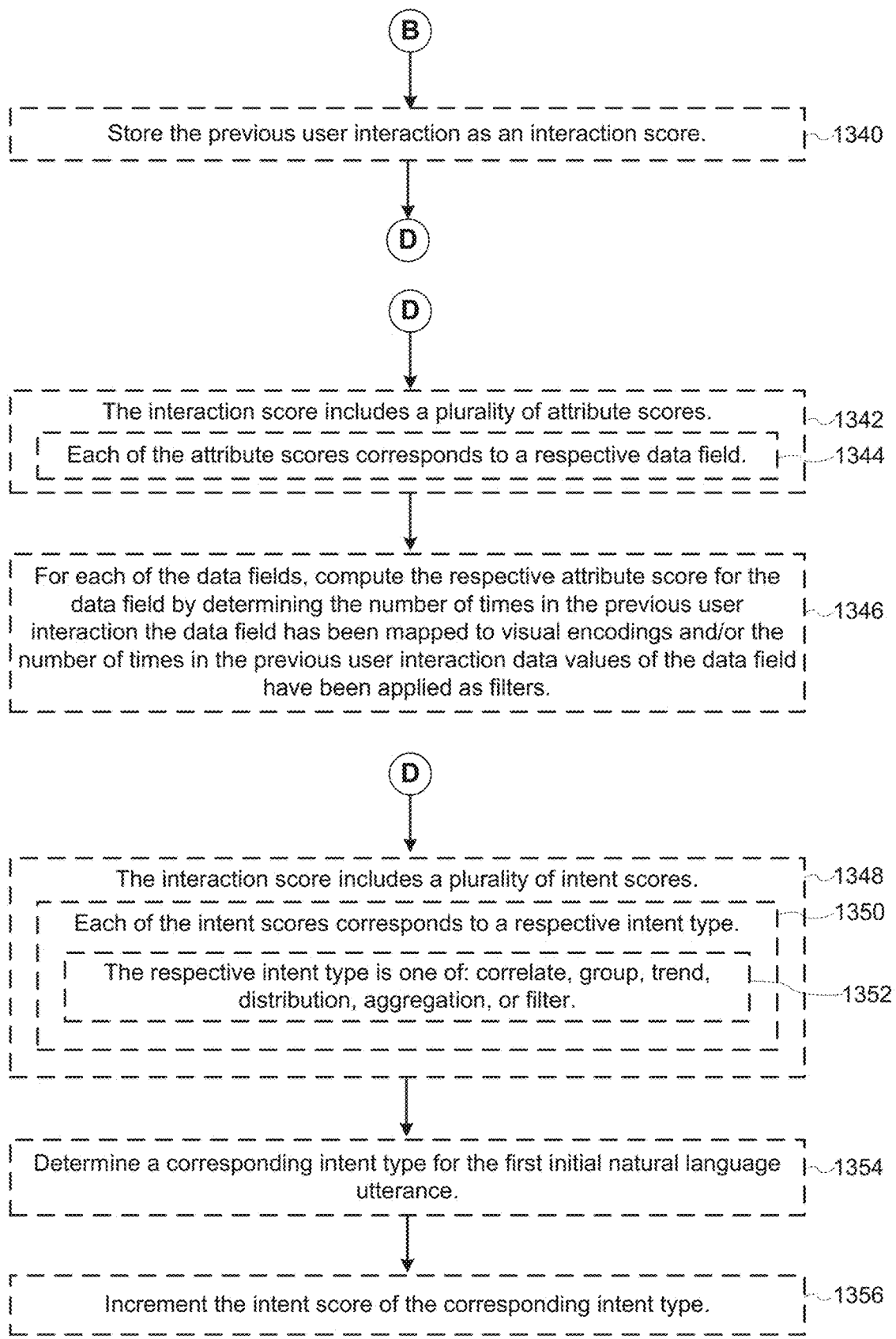
Figure 13E:
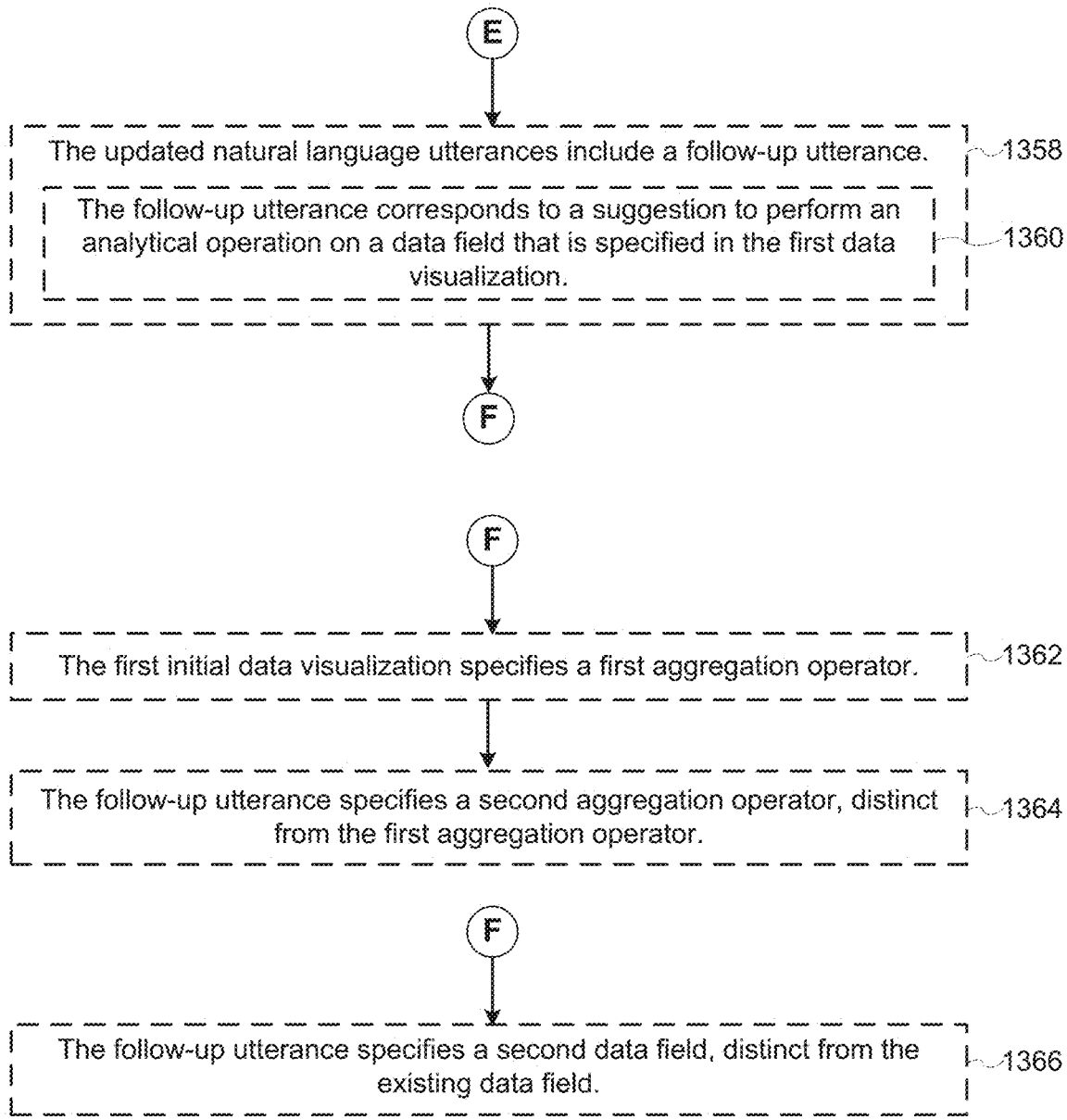
Figure 13F:
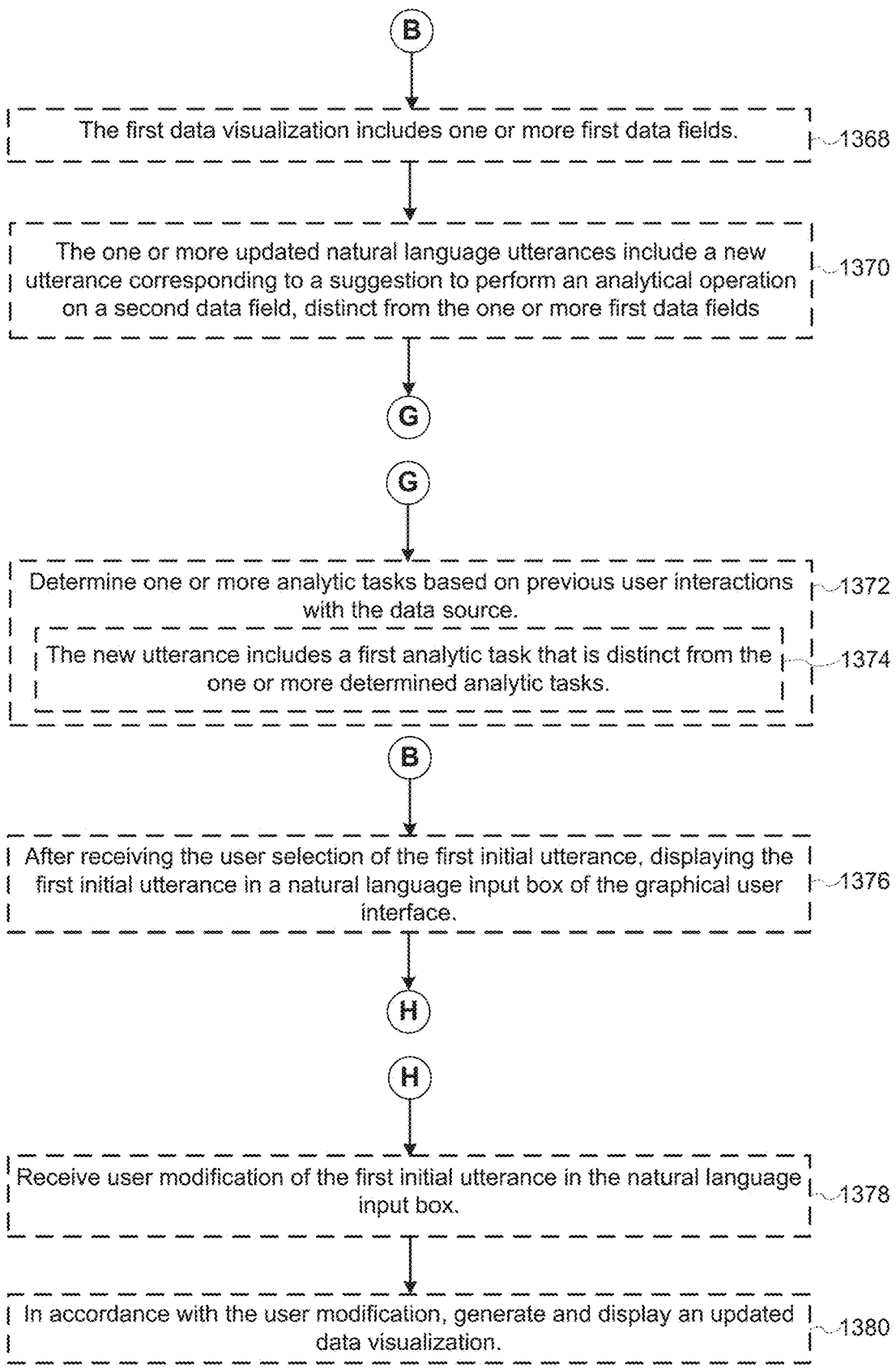
Figure 13G:
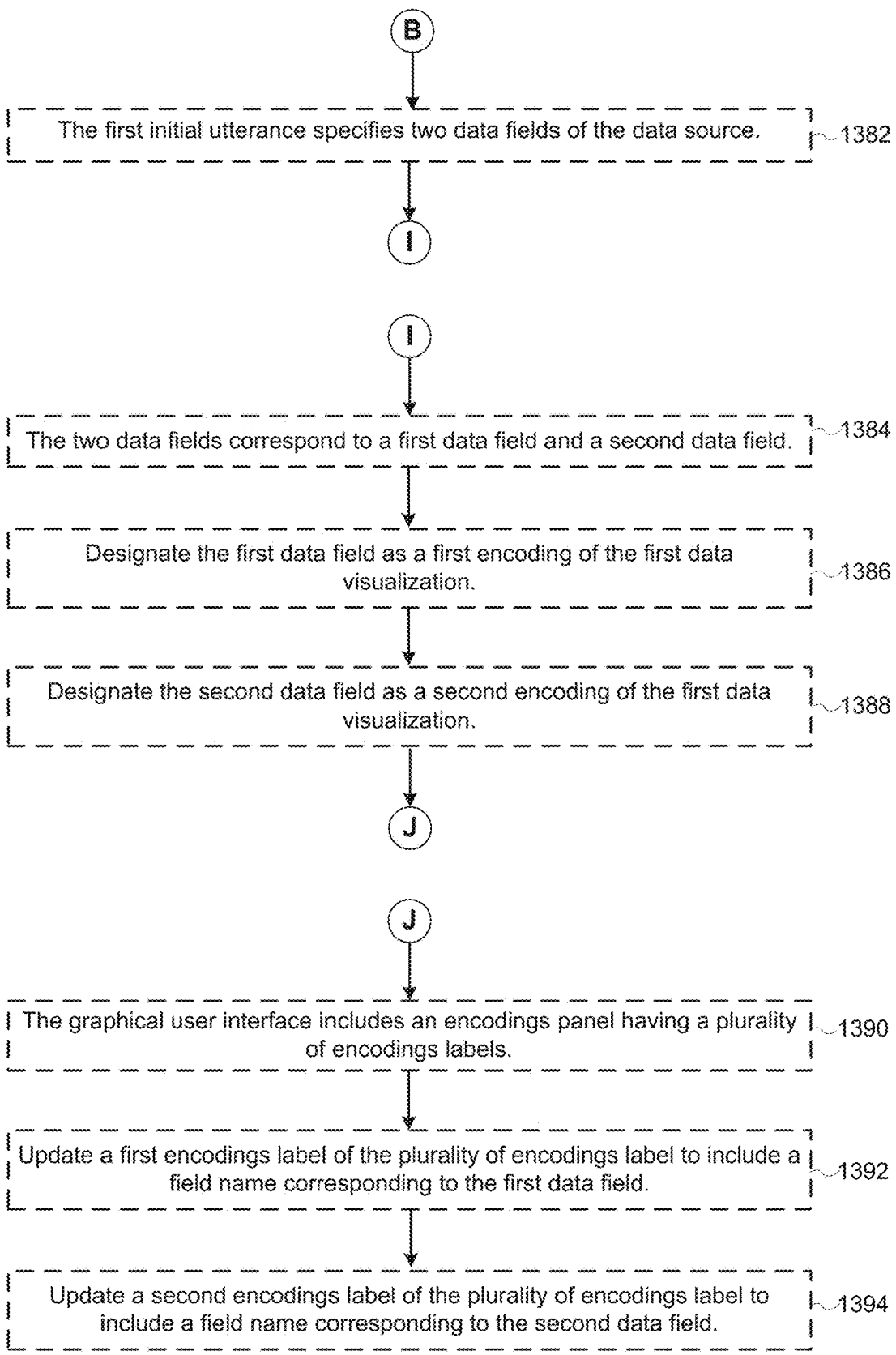

FIGS. 12A to 12U provide a series of screenshots illustrating user interactions with a "Movies" dataset 120 via a graphical user interface (GUI) 100, in accordance with some implementations. As described with reference to FIG. 1, the GUI 100 can be used in conjunction with a natural language processing system 150 (e.g., "Snowy") that recommends natural language utterances to guide visual analysis. In some implementations, the GUI 100 is an interface that is displayed on a computing device 200.

In some implementations, in response to user selection of a dataset (e.g., the "Movies" dataset 120), the computing device (e.g., via an application that includes Snowy) automatically generates and displays natural language queries that the user can pose to Snowy, to commence analysis of the dataset. As illustrated in FIG. 12A (and also described in FIG. 1), the GUI 100 includes a recommendations panel 114 (e.g., a "Suggestions" panel) for displaying natural language utterance recommendations (e.g., queries, questions, or suggestions that the user can ask or pose to the computing device). The recommendations panel 114 includes a "Follow-ups" region 116, which displays follow-up queries that are generated by the computing system. In this example, because there has been no prior interaction between the user and the "Movies" dataset 120, no follow-up query has been generated (and hence the statement 1202 "No recommendations available at this moment"). The recommendations panel 114 also includes a "New Inquiries" region 118 for displaying new queries that the user can pose to Snowy. In some implementations, the new queries are generated by Snowy in accordance with its analysis of the underlying dataset. For example, Snowy can identify combinations of attributes (e.g., pairs of data fields, or even three or more data fields) in the dataset that may be of interest to the user based on the patterns exhibited by the data.

FIG. 12A illustrates user selection (1204) of an utterance recommendation 1206 (e.g., "What is the trend of Worldwide Gross over the years?"). In this example, the utterance recommendation 1206 includes a combination of data fields "Worldwide Gross" 101-5 and "Years" (e.g., "Release Year" 101-1).

FIG. 12B illustrates that, in response to the user selection, the GUI 100 displays a data visualization 1208 (i.e., a line graph). In this example, the data visualization 1208 comprises a line graph with "Mean of Worldwide Gross" as the y-axis 1210 and "Release Year" as the x-axis 1212. In some implementations, in response to the user selection, the computing device displays text corresponding to the selected utterance recommendation in a language input command box 110, as illustrated in FIG. 12B. FIG. 12B also shows, in response to the user selection, the GUI 100 updates the encodings panel 106 to include an x-encoding field 1214 (i.e., "Release Year" 101-1), a y-encoding field 1216 (e.g., "Worldwide Gross 101-5), and an aggregation operation 1217 (e.g., "AVG" or average) that is applied to aggregate data values of the y-encoding field 1216.

In some implementations, in response to user selection of an utterance recommendation, the computing device generates and displays follow-up utterances 1218 (e.g., utterance recommendations or queries) that the user may want to pose to Snowy. This is illustrated in FIG. 12B. The follow-up utterances 1218 may be generated based on the context of the currently selected utterance recommendation (i.e., the utterance recommendation 1206) and the data visualization that is currently displayed on the visualization canvas 112.

In the example of FIG. 12B, the follow-up utterances 1218 include a first utterance 1218-1 "Compare across Content Ratings", which, when selected by a user (or entered into the natural language input box 110), causes the computing device to generate a data visualization that compares different content ratings. The follow-up utterances 1218 include a second utterance 1218-2 "Focus on the spike between 1996 and 1999", which allows the user to focus on the spike 1220 in the line chart 1208 which occurred between the years 1996 and 1999. In some implementations, the second utterance 1218-2 is generated automatically by the computing device in accordance with analysis of the underlying data fields (e.g., the data fields "Worldwide Gross" and "Release year") from which the line chart 1208 is derived. FIG. 12B also illustrates the follow-up utterances 1218 include a third utterance 1218-3 "Show me the total Worldwide Gross instead", which, when selected by the user or entered into the natural language input box 110, generates and displays a data visualization that modifies the aggregation type for data values of the data field "Worldwide Gross" from "mean" (or average) (e.g., "Mean of Worldwide Gross") to "sum" (e.g., cumulative) (e.g., "total Worldwide Gross").

FIG. 12B also illustrates that the graphical user interface 100 displays new utterances 1221 (e.g., general queries or inquiries) that a user can pose to Snowy to examine aspects of the dataset 120 (e.g., data fields) that the user has yet to explore. In some implementations, the new utterances 1221 comprise combinations of data fields that are not used to generate the data visualization that is currently displayed in the visualization canvas 112.

FIG. 12C illustrates that, in response to user selection (1222) of the first utterance 1218-1 in FIG. 12B, the computing device generates and displays an updated data visualization 1224 (e.g., a line graph) in the GUI 100. In this example, the line graph 1224 is includes four separate plots 1224-1 to 1224-4 (e.g., line graphs) corresponding to different content rating values "G", "PG", "PG-13", and "R". Each of the plots 1224-1 to 1224-4 is represented by a respective color. The encodings panel 106 identifies that the color encoding 1226 is associated with the data field "Content Rating." The GUI 100 also displays updated text in the natural language input box 110 to reflect the selected utterance 1218-1 (e.g., "Compare across Content Ratings.").

FIG. 12C also illustrates that, in response to the user selection, the computing device generates and displays updated follow-up utterances 1228 and new queries 1230.

In some implementations, Snowy also adjusts (e.g., refines) the language of the utterance recommendations in accordance with the utterances that have been selected by the user. For example, in FIG. 12C, Snowy generates a new query 1230-1 (e.g., "Now show changes in Production Budget instead"). Here, because Snowy has detected that the user started with a trend analysis of Worldwide Gross over the years (e.g., via user selection of the utterance recommendation 1206 "What is the trend of Worldwide Gross over the years?"), and then proceeded to drill down the trend analysis in terms of content ratings (e.g., via user selection of the follow-up utterance 1218-1 "Compare across Content Ratings."), it now generates an utterance 1230-1 to inform the user that instead of repeating another full-fledged trend analysis (e.g., such as "Show me the Production budget over the years"), the user can instead issue a query to "show changes in Production Budget instead." Stated another way, Snowy takes into context previous queries that have been selected by the user as well as data visualizations that have been viewed by the user, and then phrases (or rephrases) the utterances (e.g., queries) in such a way that enables the user to communicate with the system in a more natural and efficient manner.

FIG. 12D illustrates that, in response to user selection of the utterance 1230-1 in FIG. 12C, the computing device generates and displays a data visualization 1232 (e.g., a line graph) whose vertical axis 1234 is now "Mean of Production Budget" (instead of the vertical axis 1210 "Mean of Worldwide Gross in FIGS. 12B and 12C). The data visualization 1232 includes separate plots corresponding to the different content ratings. The encodings panel 106 identifies that the y-encoding 1216 is now associated with the data field "Production budget."

FIG. 12E illustrates a user interaction with an utterance recommendation 1236 (e.g., "Compare average IMDB Rating across Major Genres.") In this example, the user may be interested in a comparison analysis but may not be that interested in the data field "IMDB Rating." FIG. 12E illustrates user selection of an affordance 1238, which, when selected, allows the user to view similar utterances.

FIG. 12F illustrates that, in response to user selection of the affordance 1238 in FIG. 12E, the computing device displays a window 1240 (e.g., a popup window within the GUI 100), which includes example utterances 1242 having attribute combinations that are similar to the utterance 1236. In this example the user selects the fourth utterance 1242-4 "Show average Worldwide Gross by Major Genres" instead of any of the first three recommendations 1242-1, 1242-2, or 1242-3.

FIG. 12G illustrates that, in response to user selection of the utterance 1242-4, the graphical user interface 100 displays a data visualization 1254 (e.g., a vertical bar chart), in which each of the data bars in the chart 1254 corresponds to a respective distinct data value of the data field "Major Genre" 101-3. Each data bar has a height corresponding to the mean worldwide gross value of the genre for which the bar corresponds.

FIG. 12G also illustrates display of follow-up utterances 1256 in the GUI 100 (e.g., which are generated by Snowy in response to the selected utterance 1242-4 and/or the displayed visualization 1254). In this example, the follow-up utterances 1256 include a first utterance 1256-1 "Just show Adventure, Action, and Musical", which, when selected, applies a filter to the data field "Major Genre" such that only data rows corresponding to the data values "Adventure," "Action," and "Musical" are displayed. The follow-up utterances 1256 include a second utterance 1256-2 "How about the total values?", which, when selected, changes the vertical axis of the bar chart from "Mean of Worldwide Gross" to "Sum of Worldwide Gross." The follow-up utterances 1256 include a third utterance 1256-3 "Compare Across Creative Types." Here, the computing device detects that because the color encoding 1226 has not been defined (e.g., is empty), the user can compare the average worldwide gross values of major genres and the average worldwide gross values of another data field "Creative Gross" using a stacked bar chart.

In some implementations, the computing device also arranges (e.g., ranks) the utterance recommendations in an order that is in accordance with user interactions (e.g., user-selected utterances). In this example, because the user had previously elected (e.g., via selection of the utterance 1242-4) to compare attribute values (genres) while looking at a line chart, the computing device arranges (e.g., re-orders or ranks) the utterances 1256 so that the utterance 1256-3, corresponding to a comparison analysis, is placed at a lower position than the first two utterances 1256-1 and 1256-2 in the follow-up suggestions. Stated another way, in some implementations, the computing device assigns a higher ranking to data fields and/or analytical operations that a user has yet to select, to implicitly help the user learn and discover its natural language understanding capabilities.

FIG. 12H illustrates that, in response to user selection of the utterance 1256-1 "Just show Adventure, Action, and Musical" in FIG. 12G, the computing device generates and displays an updated visualization 1258 (i.e., a bar chart) consisting of three data bars for "Adventure," "Action," and "Musical." The graphical user interface 100 also displays, in the filters panel 104, an indication that a filter 1260 for "Action, Adventure, and Musical" has been applied to generate the visualization 1258. In other words, the data visualization 1258 is generated by filtering data values of the data field "Major Genre" to the three specific values of "Action", "Adventure", and "Musical".

FIG. 12I illustrates that, in response to user selection of an arrow 1262 (in FIG. 12H) next to the filter 1260, the GUI 100 displays a dropdown menu 1266, which includes a list of genres, corresponding to all data values of the data field "Major Genre." In this example, checkmarks 1268 are shown next to the genres (e.g., data values) "Action", "Adventure", and "Musical", corresponding to data values of the filter 1260. The user can modify the filter by selecting or de-selecting the values in the dropdown menu 1266.

FIG. 12J illustrates user selection (1270) of an utterance 1272 (e.g., "Plot IMDB rating versus Rotten Tomatoes Rating").

FIG. 12K illustrates that, in response to the user selection, the GUI 100 displays a data visualization 1274 (e.g., a scatter plot), which includes "IMDB Rating" on the vertical axis 1276 and "Rotten Tomatoes Rating" on the horizontal axis 1278. In this example, the computing device generates a scatter plot because two quantitative data fields "IMDB Rating" and "Rotten Tomatoes Rating" are mapped to the x- and y-channels. In this example, the scatter plot 1274 shows the trend between these two ratings is approximately linear.

In the example of FIG. 12K, the computing device (e.g., via Snowy) detects that previous user interactions (e.g., user selections) included content rating. Thus, the computing device generates a follow-up utterance 1280 (e.g., "Drill down into PG-13") that, when selected by the user, filters the data points in the scatter plot 1274 to those with value (i.e., rating) "PG-13."

FIG. 12L illustrates that, in response to user selection of the utterance 1280, the GUI 100 displays an updated scatter plot 1282 whose data points correspond to the rating PG-13. In this example, the computing device applies a filter that limits data rows of the "Movies" dataset 120 to a subset of data rows whose value for "Content Rating" is PG-13. FIG. 12L also illustrates that the filters panel 104 has been updated to include a content rating filter 1284 with the value "PG-13."

In some implementations, the user can also interact directly with data fields using drag-and-drop operations. FIG. 12M illustrates user selection (1286) of the data field 101-6 "Production Budget." FIG. 12N shows user placement (1288) of the data field 101-6 into the x-encoding 1214 field box in the encodings panel 106 (e.g., via a drag-and-drop action from the attribute panel 102 to the encodings panel 106).

FIG. 12O illustrates that, in response to the placement of the data field in the encodings panel 106, the GUI 100 displays an updated data visualization 1290, which comprises a scatter plot with vertical axis (e.g., y-axis) "IMDB Rating" and horizontal axis (e.g., x-axis) "Production Budget." Notice that in this example, the GUI 100 no longer displays the text (e.g., utterance) that was previously in the input box 110, because that text is no longer valid in the present context. Instead, the GUI 100 displays an updated description (e.g., "Mapping Production budget to the x axis") of the data visualization in a feedback region 1292 that is located underneath the command box 110. The GUI 100 also displays updated recommendations (e.g., follow-up queries 1294 and new queries 1296) that are generated by the computing system. Thus, the recommendations are not just based on language input or previous recommendations. User manipulation (e.g., selection) of data fields can also influence system generation of subsequent recommendations.

FIG. 12P illustrates another user interaction with the GUI 100. In this example, the user selects the data field "Worldwide Gross" 101-5 from the attribute panel, and then drags (1298) and drops (12100) the data field 101-5 into the y-encoding 1216 field in the encodings panel 106.

FIG. 12Q illustrates that, in response to the user interaction, the GUI 100 displays an updated visualization 12102, which comprises a scatter plot with x-axis "Production Budget" and y-axis "Worldwide Gross." FIG. 12Q also illustrates the GUI 100 displays updated utterances 12104 and 12106 in response to the user interaction.

In this example, the updated utterances 12104 includes a first follow-up utterance 12104-1 that, when selected, allows the user to compare the relationship between the two values "Worldwide Gross" and "Production Budget" across another categorical variable (e.g., data field) "Creative Types." In some implementations, the system generates the utterance 12104-1 in accordance with a determination that the categorical variable "Creative Types" is a data field that the user has yet to examine (e.g., explore).

FIG. 12R illustrates that, in response to user selection of the first follow-up utterance 12104-1, the GUI 100 displays a data visualization 12108, which comprises a scatter plot with data points that show the relationship between the data fields "Worldwide Gross" and "Production Budget." In this example, the data points on the scatter plot 12108 are color-coded according to a creative type. The data visualization 12108 includes a legend 12110, which identifies each creative type and the color to which it corresponds in the data visualization 12108. The encodings panel 106 also identifies that the x-encoding corresponds to the data field "Production Budget," the y-encoding corresponds to the data field "Worldwide Gross," and the color encoding corresponds to the data field "Creative Type."

FIG. 12S illustrates a user definition of a region of interest ("ROI") 12112 within the visualization 12108. In this example, the user selects (e.g., via a mouse click) a first point 12114 on the visualization 208. The user then performs a hold-and-drag operation with the mouse to define a diagonally opposite point 12116, thereby defining the ROI 12112. After defining the ROI 12112, the user then selects (12118) an utterance 12120 (e.g., "What are the average values?"). This is illustrated in FIG. 12T. Note that the recommended utterance is based on the user selection of points in the scatterplot 12108.

FIG. 12U illustrates that, in response to user selection of the utterance 12120, the GUI 100 displays a text output "The averages are 135M, 738M" in the feedback region 1292. In this example, the computing device computes the average values corresponding to "Worldwide Gross" and "Production Budget" for data points that are included in the ROI 12112.

D. Flowchart

FIGS. 13A-13G provide a flowchart of a method 1300. The method 1300 is also called a process.

The method 1300 is performed (1302) at a computing device 200 that has a display 212, one or more processors 202, and memory 206. The memory 206 stores (1304) one or more programs configured for execution by the one or more processors 202. In some implementations, the operations shown in FIGS. 1, 5 to 11, and 12A to 12U correspond to instructions stored in the memory 206 or other non-transitory computer-readable storage medium. The computer-readable storage medium may include a magnetic or optical disk storage device, solid state storage devices such as Flash memory, or other non-volatile memory device or devices. The instructions stored on the computer-readable storage medium may include one or more of: source code, assembly language code, object code, or other instruction format that is interpreted by one or more processors. Some operations in the method 500 may be combined and/or the order of some operations may be changed.

The computing device 200 receives (1306) user selection of a data source 240 or dataset 120.

In accordance with (1308) the user selection of the data source, the computing device 200 generates (1310) one or more initial natural language utterances (e.g., utterance recommendations or queries) according to metrics of data fields in the data source and/or previous user interaction with the data source. For example, the metrics can include statistical metrics derived from the underlying data of the data source, such as a number of times a data field of the data source has been viewed, correlations between data fields in the data source, and interaction scores in a context state object that is modeled using Snowy. Each of the initial natural language utterances corresponds (1311) to a respective suggestion to guide visual analysis of the data source.

The computing device 200 displays (1312) the initial utterances in a graphical user interface (GUI) 100 (e.g., on a side pane of the GUI 100). In some implementations, the computing device 200 displays the initial utterances as an ordered list.

The computing device 200 receives (1314) user selection of a first initial utterance of the initial utterances. This is illustrated, for example, in FIG. 12A.

In response (1316) to the user selection of the first initial utterance, the computing device 200 generates (1318) a first data visualization in accordance with one or more data fields and/or analytical operations specified in the first initial utterance.

The computing device 200 displays (1320) the first data visualization.

The computing device 200 then generates (1322) updated natural language utterances (e.g., updated utterance recommendations, updated queries) in accordance with the first initial utterance and the first data visualization.

The computing device 200 displays (1324) the updated utterances with the data visualization. This is illustrated, for example, in FIG. 12B.

In some implementations, the updated utterances include one or more follow-up utterances (e.g., the follow-up utterances 1218 in FIG. 12B) and/or one or more new inquiries (e.g., the new utterances 1221 in FIG. 12B).

In some implementations, the one or more initial natural language utterances consist solely of new utterances (i.e., no follow-up utterance), because no data visualization has been displayed yet. This is illustrated in FIG. 12A

In some implementations, after displaying the first data visualization, the computing device 200 determines (1326) a context state according to one or more of: the first data visualization (e.g., the first data visualization is a visualization that is currently displayed in the GUI 100), data marks of the first data visualization, the first initial utterance (e.g., an active utterance), and the previous user interaction with the data source (e.g., data exploration history log 338). In some implementations, the computing device 200 directly captures the data marks of the first data visualization (and the first data visualization itself) from the visualization canvas 112. In some implementations, the computing device 200 captures the first initial utterance from the natural language input box 110. The one or more updated natural language utterances are generated (1328) (e.g., by the computing device 200) further in accordance with the determined context state.

In some implementations, the computing device generates the updated natural language utterances, including: determining (1330) a plurality of utterance types corresponding to the updated utterances based on the determined context state and ranking (1332) the plurality of utterance types to determine a subset of utterance types. For each (1334) utterance type in the subset, the computing device 200 parameterizes (1336) the respective utterance type with one or more respective data fields and/or aggregation functions. The computing device forms (1338) a respective updated natural language utterance by linguistically realizing the respective utterance type.

In some implementations, the computing device 200 stores (1340) the previous user interaction as an interaction score. In some implementations, the computing device 200 stores the interaction scores locally on the computing device 200. In some implementations, the interaction scores are stored on another computing system, such as a data visualization server 300 that is communicatively connected with the computing device 200.

In some implementation, the interaction score includes (1342) a plurality of attribute scores. Each of the attribute scores corresponds (1344) to a respective data field. For each of the data fields, the computing device 200 computes (1346) the respective attribute score for the data field by determining (e.g., tracking) the number of times in the previous user interaction the data field has been mapped to visual encodings and/or the number of times in the previous user interaction data values of the data field have been applied as filters.

In some implementations, the interaction score includes (1348) a plurality of intent scores. Each of the intent scores corresponds (1350) to a respective intent type.

In some implementations, the respective intent type is (1352) one of: correlate, group, trend, distribution, aggregation, or filter.

In some implementations, the computing device 200 determines (1354) a corresponding intent type for the first initial natural language utterance. The computing device 200 increments (1356) the intent score of the corresponding intent type (e.g., adding 1 to the intent score).

In some implementations (e.g., as discussed with reference to FIG. 2), intent scores (e.g., interaction scores for intents) can be incremented in three scenarios. First, user selection of an utterance recommendation increments the intent score for the recommendation's corresponding intent. Second, when NL utterances are manually entered, Snowy infers the underlying intent from the input utterance and increments the score based on its confidence in the interpretation. Third, for the "filter" intent, the score is also incremented if new filters are manually applied through the GUI 100.

In some implementations, the updated natural language utterances include (1358) a follow-up utterance. The follow-up utterance corresponds (1360) to a suggestion to perform an analytical operation on a data field that is specified in the first data visualization.

In some implementations, the first initial data visualization specifies (1362) a first aggregation operator (e.g., average or count). The follow-up utterance specifies (1364) a second aggregation operator (e.g., sum or difference), distinct from the first aggregation operator.

In some implementations, the follow-up utterance specifies (1366) a second data field (e.g., an additional attribute), distinct from the existing data field. (e.g., the follow-up utterance comprises a suggestion to execute a drill down operation that includes the second data field.)

In some implementations, the first data visualization includes (1368) one or more first data fields. The one or more updated natural language utterances include (1370) a new utterance (e.g., a new utterance recommendation or a new query suggestion) corresponding to a suggestion to perform an analytical operation on a second data field, distinct from the one or more first data fields (the second data field is a data field that is not included in the initial data visualization).

In some implementations, the computing device 200 determines (1372) one or more analytic tasks based on previous user interactions with the data source. The new utterance includes (1374) a first analytic task that is distinct from the one or more determined analytic tasks.

In some implementations, after receiving the user selection of the first initial utterance, the computing device 200 displays (1376) the first initial utterance in a natural language input box (e.g., natural language input box 110) of the graphical user interface (e.g., GUI 100).

In some implementations, the computing device 200 receives (1378) user modification of the first initial utterance in the natural language input box. In accordance with the user modification, the computing device 200 generates (1380) and displays an updated data visualization.

In some implementations, the first initial utterance specifies (1382) two data fields of the data source.

For example, in some implementations, the computing device 200 (e.g., via Snowy 150) examines the underlying data to identify potentially interesting pairs (i.e., two) or combinations (e.g., two or more) of data fields that a user can explore, and each pair of data fields, or combination of data fields, has a respective utterance recommendation.

In some implementations, the two data fields correspond (1384) to a first data field and a second data field. The computing device 200 designates (1386) (e.g., assigns) the first data field as a first encoding of the first data visualization (e.g., an x-encoding, corresponding to the horizontal axis of the first data visualization). The computing device 200 designates (1388) (e.g., assigns) the second data field as a second encoding of the first data visualization (e.g., a y-encoding, corresponding to the vertical axis of the first data visualization). The first encoding is distinct from the second encoding.

In some implementations, the graphical user interface includes an encodings panel (e.g., an encodings panel 106) having a plurality of encoding labels (e.g., fields for x-encoding, y-encoding, and/or color encoding). The computing device 200 updates (1392) a first encoding label of the plurality of encoding labels to include a field name corresponding to the first data field. The computing device 200 updates (1394) a second encoding label of the plurality of encoding labels to include a field name corresponding to the second data field.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory stores a subset of the modules and data structures identified above. Furthermore, the memory may store additional modules or data structures not described above.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

Note that the various implementations described above can be combined with any other implementations described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

What is claimed is:

1. A method, comprising:
    at a computing device having a display, one or more processors, and memory storing one or more programs configured for execution by the one or more processors:
    receiving user selection of a data source;
    in accordance with the user selection of the data source:
        generating, by the computing device, one or more initial natural language utterances according to metrics of data fields in the data source, each of the initial natural language utterances corresponding to a respective suggestion to guide visual analysis of the data source; and
        displaying the initial utterances in a graphical user interface;
    receiving, via the graphical user interface, user selection of a first initial utterance of the initial utterances generated by the computing device; and
    in response to the user selection of the first initial utterance generated by the computing device:
        generating a first data visualization in accordance with one or more data fields and/or analytical operations specified in the first initial utterance;
        displaying the first data visualization;
        generating, by the computing device, one or more updated natural language utterances in accordance with (i) the selected first initial utterance, (ii) the displayed first data visualization, and (iii) user interaction with the displayed data visualization; and
        displaying the updated natural language utterances with the first data visualization.

2. The method of claim 1, further comprising:
    after displaying the first data visualization, determining a context state according to one or more of:
    the first data visualization;
    data marks of the first data visualization;
    the first initial utterance; and
    previous user interaction with the data source;
    wherein generating the one or more updated natural language utterances includes generating the one or more updated natural language utterances in accordance with the determined context state.

3. The method of claim 2, wherein generating the one or more updated natural language utterances further comprises:
    determining a plurality of utterance types corresponding to the updated utterances based on the determined context state;
    ranking the plurality of utterance types to determine a subset of utterance types; and
    for each utterance type in the subset:
        parameterizing the respective utterance type with one or more respective data fields and/or aggregation functions; and
        forming a respective updated natural language utterance by linguistically realizing the respective utterance type.

4. The method of claim 1, further comprising storing a previous user interaction as an interaction score.

5. The method of claim 4, wherein:
the interaction score includes a plurality of attribute scores, each of the attribute scores corresponding to a respective data field; and
the method further comprises:
for each of the data fields, computing the respective attribute score for the data field by determining a number of times in the previous user interaction the data field has been mapped to visual encodings and/or a number of times in the previous user interaction that data values of the data field have been applied as filters.

6. The method of claim 4, wherein:
the interaction score includes a plurality of intent scores, each of the intent scores corresponding to a respective intent type; and
the method further comprises:
determining a corresponding intent type for the first initial utterance; and
incrementing the intent score of the corresponding intent type.

7. The method of claim 6, wherein the respective intent type is selected from the group consisting of: correlate, group, trend, distribution, aggregation, and filter.

8. The method of claim 1, wherein generating, by the computing device, the one or more updated natural language utterances includes generating a follow-up utterance corresponding to a suggestion to perform an analytical operation on a first data field that is specified in the first data visualization.

9. The method of claim 8, wherein:
the first initial utterance specifies a first aggregation operator; and
the follow-up utterance specifies a second aggregation operator, distinct from the first aggregation operator.

10. The method of claim 8, wherein the follow-up utterance specifies a second data field, distinct from the first data field.

11. The method of claim 1, wherein:
the first data visualization includes one or more first data fields; and
generating, by the computing device, the one or more updated natural language utterances includes generating a new utterance corresponding to a suggestion to perform an analytical operation on a second data field, distinct from the one or more first data fields.

12. The method of claim 11, further comprising:
determining one or more analytic tasks based on previous user interactions with the data source;
wherein the new utterance includes a first analytic task that is distinct from the one or more determined analytic tasks.

13. The method of claim 1, further comprising:
after receiving, via the graphical user interface, the user selection of the first initial utterance generated by the computing device, displaying the first initial utterance in a natural language input box of the graphical user interface.

14. The method of claim 13, further comprising:
receiving user modification of the first initial utterance in the natural language input box; and
in accordance with the user modification, generating and displaying an updated data visualization.

15. The method of claim 1, wherein the first initial utterance specifies two data fields of the data source.

16. The method of claim 15, wherein:
the two data fields correspond to a first data field and a second data field; and
the method further comprises:
designating the first data field as a first encoding of the first data visualization; and
designating the second data field as a second encoding of the first data visualization;
wherein the first encoding is distinct from the second encoding.

17. The method of claim 16, wherein:
the graphical user interface includes an encodings panel having a plurality of encoding labels; and
the method further comprises:
updating a first encoding label of the plurality of encoding labels to include a field name corresponding to the first data field; and
updating a second encoding label of the plurality of encoding labels to include a field name corresponding to the second data field.

18. A computing device, comprising:
a display;
one or more processors; and
memory coupled to the one or more processors, the memory storing one or more programs configured to be executed by the one or more processors, the one or more programs including instructions for:
receiving user selection of a data source;
in accordance with the user selection of the data source:
generating, by the computing device, one or more initial natural language utterances according to metrics of data fields in the data source, each of the initial natural language utterances corresponding to a respective suggestion to guide visual analysis of the data source; and
displaying the initial utterances in a graphical user interface;
receiving, via the graphical user interface, user selection of a first initial utterance of the initial utterances generated by the computing device; and
in response to the user selection of the first initial utterance generated by the computing device:
generating a first data visualization in accordance with one or more data fields and/or analytical operations specified in the first initial utterance;
displaying the first data visualization;
generating updated natural language utterances in accordance with (i) the selected first initial utterance, (ii) the displayed first data visualization, and (iii) user interaction with the displayed data visualization; and
displaying the updated natural language utterances with the first data visualization.

19. The computing device of claim 18, the one or more programs further including instructions for:
after displaying the first data visualization, determining a context state according to one or more of:
the first data visualization;
data marks of the first data visualization;
the first initial utterance; and
previous user interaction with the data source;
wherein the one or more updated natural language utterances are generated further in accordance with the determined context state.

20. A non-transitory computer-readable storage medium storing one or more programs, the one or more programs comprising instructions, which when executed by a computing device, cause the computing device to perform operations comprising:
    receiving user selection of a data source;
    in accordance with the user selection of the data source:
        generating, by the computing device, one or more initial natural language utterances according to metrics of data fields in the data source, each of the initial natural language utterances corresponding to a respective suggestion to guide visual analysis of the data source; and
        displaying the initial utterances in a graphical user interface;
    receiving, via the graphical user interface, user selection of a first initial utterance of the initial utterances generated by the computing device; and
    in response to the user selection of the first initial utterance generated by the computing device:
        generating a first data visualization in accordance with one or more data fields and/or analytical operations specified in the first initial utterance;
        displaying the first data visualization;
        generating updated natural language utterances in accordance with (i) the selected first initial utterance, (ii) the displayed first data visualization, and (iii) user interaction with the displayed data visualization; and
        displaying the updated natural language utterances concurrently with the first data visualization.

* * * * *